United States Patent
Casey et al.

(10) Patent No.: US 12,491,075 B2
(45) Date of Patent: Dec. 9, 2025

(54) SYSTEMS AND METHODS FOR DESIGNING ORTHOPEDIC IMPLANTS BASED ON TISSUE CHARACTERISTICS

(71) Applicant: Carlsmed, Inc., Carlsbad, CA (US)

(72) Inventors: Niall Patrick Casey, Carlsbad, CA (US); Michael J. Cordonnier, Carlsbad, CA (US); Justin Esterberg, Mercer Island, WA (US)

(73) Assignee: Carlsmed, Inc., Carlsbad, CA (US)

(*) Notice: Subject to any disclaimer, the term of this patent is extended or adjusted under 35 U.S.C. 154(b) by 1221 days.

(21) Appl. No.: 17/085,564

(22) Filed: Oct. 30, 2020

(65) Prior Publication Data

US 2021/0059822 A1 Mar. 4, 2021

Related U.S. Application Data

(63) Continuation-in-part of application No. 16/569,494, filed on Sep. 12, 2019, now Pat. No. 11,696,833.

(60) Provisional application No. 62/928,909, filed on Oct. 31, 2019, provisional application No. 62/730,366, filed on Sep. 12, 2018.

(51) Int. Cl.
  *A61F 2/30* (2006.01)
  *A61F 2/44* (2006.01)
  *G06T 7/00* (2017.01)

(52) U.S. Cl.
  CPC ........ *A61F 2/30942* (2013.01); *A61F 2/4425* (2013.01); *G06T 7/0012* (2013.01); *A61F 2002/30948* (2013.01); *A61F 2002/30952* (2013.01); *A61F 2002/443* (2013.01); *G06T 2207/30052* (2013.01)

(58) Field of Classification Search
  CPC .......... A61F 2/4425; A61F 2002/30948; A61F 2002/30952; A61F 2/30942
  See application file for complete search history.

(56) References Cited

U.S. PATENT DOCUMENTS

| | | |
|---|---|---|
| 4,704,686 A | 11/1987 | Aldinger |
| 4,936,862 A | 6/1990 | Walker et al. |
| 5,431,562 A | 7/1995 | Andreiko et al. |
| D420,995 S | 2/2000 | Imamura |

(Continued)

FOREIGN PATENT DOCUMENTS

| | | |
|---|---|---|
| CN | 104318009 A | 1/2015 |
| CN | 104353121 A | 2/2015 |

(Continued)

OTHER PUBLICATIONS

Clement, R.C. et al., "A proposed set of metrics for standardized outcome reporting in the management of low back pain." Acta Orthopaedica. Sep. 3, 2015;86 (5); 523-33.

(Continued)

*Primary Examiner* — Gerald Johnson
(74) *Attorney, Agent, or Firm* — Perkins Coie LLP

(57) ABSTRACT

A system and computer-implemented method for manufacturing an orthopedic implant involves analyzing tissue characteristics based on image data of anatomy. Image data of a patient can be analyzed to identify at least one tissue characteristic at different locations along anatomic elements of anatomy of interest. A patient-specific implant configuration can be determined based on the analysis of the image data of a patient.

30 Claims, 16 Drawing Sheets

(56) References Cited

U.S. PATENT DOCUMENTS

| | | |
|---|---|---|
| D436,580 S | 1/2001 | Navano |
| 6,315,553 B1 | 11/2001 | Sachdeva |
| 6,540,512 B1 | 4/2003 | Sachdeva |
| 6,696,073 B2 | 2/2004 | Boyce et al. |
| 6,772,026 B2 | 8/2004 | Bradbury |
| 6,932,842 B1 | 8/2005 | Litschko et al. |
| 6,978,188 B1 | 12/2005 | Christensen |
| 6,988,241 B1 | 1/2006 | Guttman |
| 7,174,282 B2 | 2/2007 | Hollister et al. |
| 7,187,790 B2 | 3/2007 | Sabol et al. |
| D548,242 S | 8/2007 | Viegers |
| D614,191 S | 4/2010 | Takano |
| 7,747,305 B2 | 6/2010 | Dean et al. |
| 7,756,314 B2 | 7/2010 | Karau et al. |
| 7,799,077 B2 | 9/2010 | Lang |
| D633,514 S | 3/2011 | Tokunaga |
| D656,153 S | 3/2012 | Imamura |
| 8,214,016 B2 | 7/2012 | Lavallee |
| 8,246,680 B2 | 8/2012 | Betz |
| 8,265,949 B2 | 9/2012 | Haddad |
| 8,275,594 B2 | 9/2012 | Lin |
| 8,337,507 B2 | 12/2012 | Lang |
| 8,394,142 B2 | 3/2013 | Bertagnoli |
| 8,457,930 B2 | 6/2013 | Shroeder |
| 8,532,806 B1 | 9/2013 | Masson |
| 8,556,983 B2 | 10/2013 | Bojarski et al. |
| 8,644,568 B1 | 2/2014 | Hoffman |
| 8,735,773 B2 | 5/2014 | Lang |
| 8,758,357 B2 | 6/2014 | Frey |
| 8,775,133 B2 | 7/2014 | Schroeder |
| 8,781,557 B2 | 7/2014 | Dean |
| 8,843,229 B2 | 9/2014 | Vanasse |
| 8,855,389 B1 | 10/2014 | Hoffman |
| 8,870,889 B2 | 10/2014 | Frey |
| 9,020,788 B2 | 4/2015 | Lang |
| D735,231 S | 7/2015 | Omiya |
| D737,309 S | 8/2015 | Kito |
| 9,198,678 B2 | 12/2015 | Frey et al. |
| 9,208,558 B2 | 12/2015 | Dean |
| D757,025 S | 5/2016 | Kim |
| D761,842 S | 7/2016 | Johnson |
| 9,411,939 B2 | 8/2016 | Furrer |
| 9,445,907 B2 | 9/2016 | Meridew |
| 9,452,050 B2 | 9/2016 | Miles et al. |
| D774,076 S | 12/2016 | Fuller |
| 9,542,525 B2 | 1/2017 | Arisoy et al. |
| 9,592,095 B2 | 3/2017 | Panescu |
| 9,642,633 B2 | 5/2017 | Frey et al. |
| 9,693,831 B2 | 7/2017 | Mosnier et al. |
| 9,707,058 B2 | 7/2017 | Bassett |
| 9,715,563 B1 | 7/2017 | Schroeder |
| D797,760 S | 9/2017 | Tsujimura |
| D797,766 S | 9/2017 | Ibsies |
| D798,312 S | 9/2017 | Tsujimura |
| 9,757,245 B2 | 9/2017 | O'Neil et al. |
| D798,894 S | 10/2017 | Ibsies |
| 9,775,680 B2 | 10/2017 | Bojarski et al. |
| 9,782,228 B2 | 10/2017 | Mosnier et al. |
| D812,628 S | 3/2018 | Okado |
| 9,993,341 B2 | 6/2018 | Vanasse |
| 10,022,192 B1 | 7/2018 | Ummalaneni |
| 10,034,676 B2 | 7/2018 | Donner |
| D825,605 S | 8/2018 | Jann |
| D826,977 S | 8/2018 | Nakajima |
| 10,089,413 B2 | 10/2018 | Wirx-Speetjens et al. |
| D841,675 S | 2/2019 | Hoffman |
| 10,213,311 B2 | 2/2019 | Mafhouz |
| D845,973 S | 4/2019 | Jaycobs |
| D845,974 S | 4/2019 | Cooperman |
| D847,165 S | 4/2019 | Kolbenheyer |
| D848,468 S | 5/2019 | Ng |
| D849,029 S | 5/2019 | Cooperman |
| D849,773 S | 5/2019 | Jiang |
| 10,292,770 B2 | 5/2019 | Ryan |
| 10,299,863 B2 | 5/2019 | Grbic et al. |
| D854,560 S | 7/2019 | Field |
| D854,561 S | 7/2019 | Field |
| 10,390,958 B2 | 8/2019 | Maclennan |
| D860,237 S | 9/2019 | Li |
| D860,238 S | 9/2019 | Bhardwaj |
| D866,577 S | 11/2019 | Eisert |
| D867,379 S | 11/2019 | Ang |
| D867,389 S | 11/2019 | Jamison |
| 10,463,433 B2 | 11/2019 | Turner et al. |
| D870,762 S | 12/2019 | Mendoza |
| 10,512,546 B2 | 12/2019 | Kamer et al. |
| 10,517,681 B2 | 12/2019 | Roh et al. |
| D872,117 S | 1/2020 | Kobayashi |
| D872,756 S | 1/2020 | Howell |
| D874,490 S | 2/2020 | Dodsworth |
| D875,761 S | 2/2020 | Heffernan |
| D876,454 S | 2/2020 | Knowles |
| D876,462 S | 2/2020 | Li |
| D877,167 S | 3/2020 | Knowles |
| D879,112 S | 3/2020 | Hejazi |
| 10,588,589 B2 | 3/2020 | Bregman-Amitai et al. |
| 10,603,055 B2 | 3/2020 | Donner et al. |
| D880,513 S | 4/2020 | Wang |
| D881,908 S | 4/2020 | Sunil |
| D881,910 S | 4/2020 | Lin |
| 10,621,289 B2 | 4/2020 | Schroeder |
| 10,631,988 B2 | 4/2020 | Arnold et al. |
| D884,008 S | 5/2020 | Thornberg |
| 10,646,236 B2 | 5/2020 | Donner et al. |
| 10,646,258 B2 | 5/2020 | Donner et al. |
| 10,736,698 B2 | 8/2020 | Bohl |
| 10,751,188 B2 | 8/2020 | Guo et al. |
| D896,825 S | 9/2020 | Abel |
| D896,828 S | 9/2020 | Linares |
| D898,054 S | 10/2020 | Everhart |
| D899,438 S | 10/2020 | Crafts |
| 10,806,597 B2 | 10/2020 | Sournac et al. |
| 10,902,944 B1 | 1/2021 | Casey et al. |
| D916,868 S | 4/2021 | Evangeliou |
| D916,879 S | 4/2021 | Mitsumori |
| D918,253 S | 5/2021 | Choe |
| 11,000,334 B1 | 5/2021 | Young |
| D921,675 S | 6/2021 | Kmak |
| D921,677 S | 6/2021 | Kmak |
| D921,687 S | 6/2021 | Kmak |
| D924,909 S | 7/2021 | Nasu |
| D925,567 S | 7/2021 | Hayamizu |
| D927,528 S | 8/2021 | Heisler |
| 11,083,586 B2 | 8/2021 | Cordonnier |
| D933,692 S | 10/2021 | Smith |
| D937,870 S | 12/2021 | Pinto |
| D937,876 S | 12/2021 | Harvey |
| D938,461 S | 12/2021 | Hoffman |
| D938,986 S | 12/2021 | Grossberg |
| D940,178 S | 1/2022 | Ang |
| D946,022 S | 3/2022 | Nuttbrown |
| D946,023 S | 3/2022 | Nuttbrown |
| D946,024 S | 3/2022 | Vogler-Ivashchanka |
| D946,616 S | 3/2022 | Tsai |
| 11,278,413 B1 | 3/2022 | Lang |
| D958,151 S | 7/2022 | Casey et al. |
| 11,806,241 B1 | 11/2023 | Hussain |
| 11,857,264 B2 | 1/2024 | Roh et al. |
| 2002/0007294 A1 | 1/2002 | Bradbury et al. |
| 2004/0104512 A1 | 6/2004 | Eidenschink |
| 2004/0171924 A1 | 9/2004 | Mire et al. |
| 2005/0049590 A1 | 3/2005 | Alleyne et al. |
| 2005/0234555 A1 | 10/2005 | Sutton et al. |
| 2005/0271996 A1 | 12/2005 | Sporbert et al. |
| 2005/0273170 A1 | 12/2005 | Navarro et al. |
| 2005/0277934 A1 | 12/2005 | Vardiman |
| 2006/0009780 A1 | 1/2006 | Foley |
| 2007/0118243 A1 | 5/2007 | Schroeder |
| 2007/0272747 A1 | 11/2007 | Woods et al. |
| 2007/0276369 A1 | 11/2007 | Allard et al. |
| 2007/0276501 A1 | 11/2007 | Betz |
| 2008/0161680 A1 | 7/2008 | von Jako |
| 2008/0195240 A1 | 8/2008 | Martin |
| 2008/0227047 A1 | 9/2008 | Lowe |

(56) References Cited

U.S. PATENT DOCUMENTS

| | | |
|---|---|---|
| 2008/0294265 A1 | 11/2008 | Warkentine et al. |
| 2009/0062739 A1 | 3/2009 | Anderson |
| 2010/0100011 A1 | 4/2010 | Roche |
| 2010/0191088 A1 | 7/2010 | Anderson |
| 2010/0217270 A1 | 8/2010 | Polinski |
| 2010/0217336 A1 | 8/2010 | Crawford et al. |
| 2010/0292963 A1 | 11/2010 | Schroeder |
| 2010/0324692 A1 | 12/2010 | Uthgenannt |
| 2011/0196451 A1 | 8/2011 | Hill |
| 2011/0218545 A1 | 9/2011 | Catanzarite et al. |
| 2011/0269104 A1 | 11/2011 | Berckmans |
| 2011/0301710 A1 | 12/2011 | Mather et al. |
| 2012/0010710 A1 | 1/2012 | Frigg |
| 2012/0084064 A1 | 4/2012 | Dzenis et al. |
| 2012/0116203 A1 | 5/2012 | Vancraen |
| 2012/0150243 A9 | 6/2012 | Crawford et al. |
| 2012/0179258 A1* | 7/2012 | Glazer .................. A61F 2/4611 623/17.16 |
| 2012/0191192 A1 | 7/2012 | Park |
| 2012/0287238 A1 | 11/2012 | Onishi |
| 2012/0296433 A1 | 11/2012 | Farin |
| 2012/0310364 A1 | 12/2012 | Li et al. |
| 2012/0322018 A1 | 12/2012 | Lowe |
| 2013/0079680 A1 | 3/2013 | Stein |
| 2013/0211531 A1 | 8/2013 | Steines et al. |
| 2013/0323669 A1 | 12/2013 | Lowe |
| 2014/0005531 A1 | 1/2014 | Taylor |
| 2014/0072608 A1 | 3/2014 | Karagkiozaki |
| 2014/0074438 A1 | 3/2014 | Furrer |
| 2014/0081659 A1 | 3/2014 | Nawana et al. |
| 2014/0086780 A1 | 3/2014 | Miller |
| 2014/0100886 A1 | 4/2014 | Woods |
| 2014/0135940 A1 | 5/2014 | Goldstein |
| 2014/0164022 A1 | 6/2014 | Reed |
| 2014/0244220 A1 | 8/2014 | McKinnon |
| 2014/0263674 A1 | 9/2014 | Cerveny |
| 2014/0272881 A1 | 9/2014 | Barsoum |
| 2014/0277487 A1 | 9/2014 | Davenport et al. |
| 2014/0350614 A1 | 11/2014 | Frey |
| 2015/0079533 A1 | 3/2015 | Lowe |
| 2015/0089590 A1 | 3/2015 | Krishnan et al. |
| 2015/0105891 A1 | 4/2015 | Golway et al. |
| 2015/0199488 A1 | 7/2015 | Falchuk |
| 2015/0213225 A1 | 7/2015 | Amarasingham |
| 2015/0324490 A1 | 11/2015 | Page |
| 2015/0328004 A1 | 11/2015 | Mafhouz |
| 2015/0332018 A1 | 11/2015 | Rosen |
| 2016/0001039 A1 | 1/2016 | Armour et al. |
| 2016/0012753 A1 | 1/2016 | Mehdian |
| 2016/0015465 A1* | 1/2016 | Steines ............... A61F 2/30942 623/18.11 |
| 2016/0030067 A1 | 2/2016 | Frey et al. |
| 2016/0074048 A1 | 3/2016 | Pavlovskaia |
| 2016/0081810 A1 | 3/2016 | Reiley et al. |
| 2016/0117817 A1 | 4/2016 | Seel |
| 2016/0143744 A1 | 5/2016 | Bojarski et al. |
| 2016/0184054 A1 | 6/2016 | Lowe |
| 2016/0191887 A1 | 6/2016 | Casas |
| 2016/0210374 A1 | 7/2016 | Mosnier et al. |
| 2016/0217268 A1 | 7/2016 | Otto |
| 2016/0242857 A1 | 8/2016 | Scholl |
| 2016/0262837 A1 | 9/2016 | Goette |
| 2016/0300026 A1 | 10/2016 | Bogoni et al. |
| 2016/0354039 A1 | 12/2016 | Soto et al. |
| 2016/0354213 A1 | 12/2016 | Cowan |
| 2016/0361025 A1 | 12/2016 | Reicher |
| 2016/0378919 A1 | 12/2016 | McNutt et al. |
| 2017/0000566 A1 | 1/2017 | Gordon |
| 2017/0014169 A1 | 1/2017 | Dean |
| 2017/0020679 A1 | 1/2017 | Maclennan |
| 2017/0035514 A1 | 2/2017 | Fox et al. |
| 2017/0046486 A1 | 2/2017 | Cunningham |
| 2017/0061375 A1 | 3/2017 | Laster |
| 2017/0068792 A1 | 3/2017 | Reiner |
| 2017/0112548 A1 | 4/2017 | Alamin et al. |
| 2017/0135706 A1 | 5/2017 | Frey et al. |
| 2017/0143494 A1 | 5/2017 | Mahfouz |
| 2017/0143831 A1 | 5/2017 | Varanasi et al. |
| 2017/0196499 A1 | 7/2017 | Hunter |
| 2017/0216047 A1 | 8/2017 | Hawkes et al. |
| 2017/0220740 A1 | 8/2017 | D'Urso |
| 2017/0242107 A1 | 8/2017 | Dussan et al. |
| 2017/0252107 A1 | 9/2017 | Turner et al. |
| 2017/0258526 A1 | 9/2017 | Lang |
| 2017/0262595 A1 | 9/2017 | Vorhis |
| 2017/0340447 A1 | 11/2017 | Mahfouz |
| 2017/0354510 A1 | 12/2017 | O'Neil et al. |
| 2017/0360358 A1 | 12/2017 | Amiot |
| 2017/0367645 A1 | 12/2017 | Klinder |
| 2018/0008349 A1 | 1/2018 | Gillman |
| 2018/0113992 A1 | 4/2018 | Eltorai et al. |
| 2018/0116727 A1 | 5/2018 | Caldwell et al. |
| 2018/0168499 A1 | 6/2018 | Bergold |
| 2018/0168731 A1 | 6/2018 | Reid |
| 2018/0185075 A1 | 7/2018 | She |
| 2018/0233222 A1 | 8/2018 | Daley |
| 2018/0233225 A1 | 8/2018 | Experton |
| 2018/0247020 A1* | 8/2018 | Itu .......................... G16H 10/60 |
| 2018/0250075 A1 | 9/2018 | Cho |
| 2018/0303552 A1 | 10/2018 | Ryan |
| 2018/0303616 A1 | 10/2018 | Bhattacharyya et al. |
| 2018/0308569 A1 | 10/2018 | Luellen |
| 2018/0325599 A1 | 11/2018 | Seo |
| 2018/0325608 A1 | 11/2018 | Kang et al. |
| 2018/0338841 A1 | 11/2018 | Miller et al. |
| 2018/0360609 A1* | 12/2018 | Steines ............... A61F 2/30942 |
| 2019/0019578 A1 | 1/2019 | Vaccaro |
| 2019/0029757 A1 | 1/2019 | Roh et al. |
| 2019/0039286 A1 | 2/2019 | Tempco et al. |
| 2019/0065685 A1 | 2/2019 | Pickover |
| 2019/0069956 A1 | 3/2019 | Ryan et al. |
| 2019/0088371 A1 | 3/2019 | Casey et al. |
| 2019/0099221 A1 | 4/2019 | Schmidt et al. |
| 2019/0146458 A1* | 5/2019 | Roh .................... G05B 19/4099 700/98 |
| 2019/0201106 A1 | 7/2019 | Siemionow |
| 2019/0209731 A1* | 7/2019 | Keyak ............... A61K 51/1279 |
| 2019/0262084 A1 | 8/2019 | Roh et al. |
| 2019/0266597 A1 | 8/2019 | Mohtar |
| 2019/0282367 A1 | 9/2019 | Casey et al. |
| 2019/0321132 A1 | 10/2019 | Weir |
| 2019/0321193 A1 | 10/2019 | Casey et al. |
| 2019/0328929 A1 | 10/2019 | Kugler et al. |
| 2019/0333622 A1 | 10/2019 | Levin |
| 2019/0350720 A1 | 11/2019 | Koffler et al. |
| 2019/0354693 A1 | 11/2019 | Yoon |
| 2019/0380782 A1* | 12/2019 | McAfee ............ A61B 17/7011 |
| 2019/0380792 A1 | 12/2019 | Poltaretskyi et al. |
| 2019/0388131 A1 | 12/2019 | Mehl et al. |
| 2020/0021570 A1 | 1/2020 | Lin |
| 2020/0078180 A1 | 3/2020 | Casey et al. |
| 2020/0085509 A1 | 3/2020 | Roh et al. |
| 2020/0170802 A1 | 6/2020 | Casey et al. |
| 2020/0188130 A1* | 6/2020 | Jebsen .................. A61F 2/4455 |
| 2020/0258605 A1 | 8/2020 | Blechman |
| 2020/0261156 A1 | 8/2020 | Schmidt |
| 2020/0289288 A1 | 9/2020 | Müller et al. |
| 2020/0315708 A1 | 10/2020 | Mosnier et al. |
| 2021/0064605 A1 | 3/2021 | Balint |
| 2021/0145519 A1 | 5/2021 | Mosnier et al. |
| 2021/0169576 A1 | 6/2021 | Ryan et al. |
| 2021/0192759 A1 | 6/2021 | Lang |
| 2021/0210189 A1 | 7/2021 | Casey et al. |
| 2021/0257094 A1* | 8/2021 | Takemoto ............. G06T 7/0016 |
| 2021/0287770 A1 | 9/2021 | Anderson |
| 2021/0290319 A1 | 9/2021 | Poltaretskyi et al. |
| 2021/0315706 A1* | 10/2021 | Noshchenko ....... A61F 2/30942 |
| 2021/0378752 A1 | 12/2021 | Paul |
| 2021/0382457 A1 | 12/2021 | Roh et al. |
| 2022/0000556 A1 | 1/2022 | Casey et al. |
| 2022/0000625 A1 | 1/2022 | Cordonnier |
| 2022/0006642 A1 | 1/2022 | Maj et al. |
| 2022/0013211 A1 | 1/2022 | Steinberg et al. |
| 2022/0039965 A1 | 2/2022 | Casey et al. |

(56) References Cited

U.S. PATENT DOCUMENTS

| | | |
|---|---|---|
| 2022/0047402 A1 | 2/2022 | Casey et al. |
| 2022/0110686 A1 | 4/2022 | Roh et al. |
| 2022/0160405 A1 | 5/2022 | Casey et al. |
| 2022/0160518 A1 | 5/2022 | Casey et al. |
| 2022/0313362 A1 | 10/2022 | Casey et al. |
| 2023/0023440 A1 | 1/2023 | Casey et al. |
| 2023/0087107 A1 | 3/2023 | Casey et al. |
| 2023/0138162 A1 | 5/2023 | Winston |
| 2024/0016547 A1 | 1/2024 | Casey et al. |
| 2024/0016614 A1 | 1/2024 | Casey et al. |
| 2024/0065767 A1 | 2/2024 | Cordonnier |
| 2024/0079114 A1 | 3/2024 | Casey et al. |
| 2024/0138919 A1 | 5/2024 | Casey et al. |
| 2024/0138921 A1 | 5/2024 | Roh et al. |
| 2024/0261029 A1 | 8/2024 | Casey et al. |
| 2024/0319709 A1 | 9/2024 | Roh et al. |
| 2024/0341960 A1 | 10/2024 | Casey |
| 2024/0374316 A1 | 11/2024 | Casey et al. |
| 2024/0374389 A1 | 11/2024 | Casey et al. |
| 2025/0025309 A1 | 1/2025 | Casey et al. |
| 2025/0114145 A1 | 4/2025 | Casey et al. |

FOREIGN PATENT DOCUMENTS

| | | |
|---|---|---|
| CN | 204468348 U | 7/2015 |
| CN | 105796214 A | 7/2016 |
| CN | 106202861 | 12/2016 |
| CN | 107220933 | 9/2017 |
| CN | 108670506 A | 10/2018 |
| CN | 110575289 A | 12/2019 |
| CN | 111281613 A | 6/2020 |
| CN | 112155792 A | 1/2021 |
| CN | 113643790 | 11/2021 |
| EP | 3120796 A1 | 1/2017 |
| JP | 2011517996 A | 6/2011 |
| JP | 2012531265 A | 12/2012 |
| JP | 2013523415 A | 6/2013 |
| JP | 2016503319 A | 2/2016 |
| JP | 2016536051 A | 11/2016 |
| JP | 2016540610 A | 12/2016 |
| JP | 2017510307 A2 | 4/2017 |
| WO | 9507509 A1 | 3/1995 |
| WO | 2004110309 A2 | 12/2004 |
| WO | 2008027549 A2 | 3/2008 |
| WO | 2010151564 A1 | 12/2010 |
| WO | 2011080260 A1 | 7/2011 |
| WO | 2012154534 A1 | 11/2012 |
| WO | 2014145267 A1 | 9/2014 |
| WO | 2014180972 A2 | 11/2014 |
| WO | 2015075423 A2 | 5/2015 |
| WO | 2016102025 A1 | 6/2016 |
| WO | 2016172694 A1 | 10/2016 |
| WO | 2017116346 A1 | 7/2017 |
| WO | 2018193316 A2 | 10/2018 |
| WO | 2019112917 A1 | 6/2019 |
| WO | 2019148154 A1 | 8/2019 |
| WO | 2019165152 A1 | 8/2019 |
| WO | 2019241167 A1 | 12/2019 |
| WO | 2020055874 A1 | 3/2020 |
| WO | 2022045956 A1 | 3/2022 |
| WO | 2023034405 A1 | 3/2023 |
| WO | 2024192142 A1 | 9/2024 |

OTHER PUBLICATIONS

Examination Report for European Application No. 19859930.0, mailed Mar. 12, 2024, 5 pages.
Godil, S.S. et al., "Determining the quality and effectiveness of surgical spine care: patient satisfaction is not a valid proxy." The Spine Journal: Off. Jour. Of the North American Spine Society. May 16, 2013; 13(9): 1006-12.
Hartzler, A. et al., "Integrating Patient-Reported Outcomes into Spine Surgical Care through Visual Dashboards: Lessons Learned from Human-Centered Design." eGEMs. 2015;3(2), 20 pages.
Office Action for Japanese Application No. 2021-539471, mailed May 30, 2024, 4 pages, English Translation.
Office Action for Japanese Application No. 2022-541805, mailed Jul. 25, 2024, 6 pages, English Translation.
Endo, Kenji et al. "Measurement of whole spine sagittal alignment using the Slot radiography of the Sonialvision safire series clinical application." Medical Now, No. 78; Aug. 2015, 4 pages.
International Search Report and Written Opinion for International Application No. PCT/US19/50885, mailed Jan. 28, 2020 (21 pages).
International Search Report and Written Opinion for International Application No. PCT/US19/63855, mailed Feb. 14, 2020 (15 pages).
International Searching Authority, International Search Report and Written Opinion, PCT Patent Application PCT/US2018/063530, mailed Feb. 12, 2019, 16 pages.
International Search Report and Written Opinion for International Patent Application No. PCT/US21/12065, mailed Apr. 29, 2021 (19 pages).
Materialise Mimics, "Efficiently turn scans into accurate virtual 3D models," <www.materialize.com/en/medical/software/mimics>, 1 page.
Pimenta, Dr. Luiz, "Current Surgical Strategies to Restore Proper Sagittal Alignment," Journal of Spine 2015, vol. 4, Issue 4, 2 pages.
U.S. Appl. No. 15/958,409 for Ryan, filed Apr. 21, 2017.
Eshkalak, S.K. et al., "The role of three-dimensional printing in healthcare and medicine." Materials and Design 194, Jul. 10, 20202, 15 pages.
Extended European Search Report for European Application No. 19859930.0, mailed Jun. 22, 2022, 7 pages.
International Search Report and Written Opinion for International Patent Application No. PCT/US21/60074, mailed Mar. 17, 2022, 21 pages.
Pruthi, G. et al., "Comprehensive review of guidelines to practice prosthodontic and implant procedures during COVID-19 pandemic." Journal of Oral Biology and Craniofacial Research 10, Oct. 17, 2020, 8 pages.
U.S. Appl. No. 17/463,054 for Casey et al., filed Aug. 31, 2021.
U.S. Appl. No. 17/518,524 for Cordonnier, filed Nov. 3, 2021.
U.S. Appl. No. 17/678,874 for Cordonnier, filed Feb. 23, 2022.
U.S. Appl. No. 17/702,591 for Roh et al., filed Mar. 23, 2022.
U.S. Appl. No. 17/835,777 for Cordonnier, filed Jun. 8, 2022.
U.S. Appl. No. 17/838,727 for Casey et al., filed Jun. 13, 2022.
U.S. Appl. No. 17/842,242 for Cordonnier, filed Jun. 16, 2022.
U.S. Appl. No. 17/851,487 for Cordonnier, filed, Jun. 28, 2022.
U.S. Appl. No. 17/856,625 for Cordonnier, filed, Jul. 1, 2022.
U.S. Appl. No. 17/867,621 for Cordonnier, filed, Jul. 18, 2022.
U.S. Appl. No. 17/875,699 for Casey et al., filed, Jul. 28, 2022.
U.S. Appl. No. 17/878,633 for Cordonnier, filed, Aug. 1, 2022.
U.S. Appl. No. 17/880,277 for Casey et al., filed, Aug. 3, 2022.
Extended European Search Report for European Application No. 18885367.5, mailed Aug. 16, 2021, 8 pages.
International Search Report and Written Opinion for International Application No. PCT/US21/44878, mailed Nov. 16, 2021, 18 pages.
International Search Report and Written Opinion for International Application No. PCT/US21/45503, mailed Jan. 11, 2022, 19 pages.
International Search Report and Written Opinion for International Patent Application No. PCT/US21/59837, mailed Feb. 7, 2022, 19 pages.
Majdouline et al., "Preoperative assessment and evaluation of instrumentation strategies for the treatment of adolescent idiopathic scoliosis: computer simulation and optimization." Scoliosis 7, 21 (2012), pp. 1-8.
Examination Report for European Application No. 19890663.8, mailed Feb. 7, 2024, 4 pages.
Extended European Search Report for European Application No. 19890663.8, mailed Jul. 29, 2022, 8 pages.
Extended European Search Report for European Application No. 21738283.7, mailed Jan. 2, 2024, 9 pages.
Hammoudeh J.A. et al., "Current Status of Surgical Planning for Orthognathic Surgery: Traditional Methods versus 3D Surgical Planning." PRS Global Open, Feb. 2015, 11 pages.
Harrysson, O. et al., "Custom-designed orthopedic implants evaluated using finite element analysis of patient-specific computed

(56) References Cited

OTHER PUBLICATIONS tomography data: femoral-component case study." BMC Musculoskeletal Disorders. Dec. 2007, 8:91, 10 pages.

International Search Report and Written Opinion for International Application No. PCT/US22/37640, mailed Nov. 15, 2022, 13 pages.

International Search Report and Written Opinion for International Patent Application No. PCT/US23/36137, mailed Mar. 5, 2024, 20 pages.

Mangano C. et al., "Combining Intraoral Scans, Cone Beam Computed Tomography and Face Scans: The Virtual Patient." Journal of Craniofacial Surgery, Nov. 1, 2018:29(8): 27 pages.

Office Action for Japanese Application No. 2020-550591, mailed Dec. 26, 2022, 4 pages, English Translation.

Office Action for Japanese Application No. 2020-550591, mailed Sep. 21, 2023, 4 pages, English Translation.

Office Action for Japanese Application No. 2021-539471, mailed Aug. 3, 2023, 5 pages, English Translation.

Office Action for Japanese Application No. 2021-531331, mailed Oct. 23, 2023, 2 pages, English Translation.

Swennen, G.R.J. et al., "Three-Dimensional Treatment Planning of Orthognathic Surgery in the Era of Virtual Imaging." American Assoc. of Oral and Maxillofacial Surgeons 67:2080-2092, 2009.

U.S. Appl. No. 18/071,566 for Casey et al., filed Nov. 29, 2022.

De Beer, N. et al., "Patient-specific intervertebral disc implants using rapid manufacturing technology." Rapid Prototyping Journal 19.2: 2013, 126-139.

Haglin, J.M. et al., "Patient-specific orthopaedic implants." Orthopaedic surgery 8.4: 2016, 417-424.

Examination Report mailed Apr. 8, 2025 for Australian Patent Application No. 2021205797, 3 pages.

Examination Report mailed Apr. 22, 2025 for Australian Patent Application No. 2021205797, 3 pages.

Examination Report mailed Jun. 19, 2025 for Australian Patent Application No. 2021205797, 5 pages.

Kyakhov, et al. "Neural network system for analyzing statistical factors of patients for predicting the survival of dental implants," Frontiers in Neuroinformatics, Dec. 7, 2002; 16:1067040.

\* cited by examiner

| | | |
|---|---|---|
| Surgeon: | Dr. X | |
| Patient ID: | 2018XXXXX | |
| Prescription ID: | 2018XXXXX | |
| Implant PNs: | 2018XXXXX 2018XXXXX 2018XXXXX 2018XXXXX 2018XXXXX | |
| Surgery date: | 10/12/2018 | |

| Metric | Pathology | Plan | Modifications to Plan |
|---|---|---|---|
| Levels | L1 – S1 | L1 – S1 | |
| PI | 55 deg | 55 deg | n.a. |
| Lordosis (degrees) | 40 deg | 60 deg | |
| - L1/2 | 5 | 8 | |
| - L2/3 | 5 | 10 | |
| - L3/4 | 7 | 10 | |
| - L4/5 | 8 | 12 | |
| - L5/S1 | 15 | 20 | |
| Disc height | 45mm | 57mm | |
| - L1/2 | 7 | 9 | |
| - L2/3 | 9 | 12 | |
| - L3/4 | 10 | 14 | |
| - L4/5 | 11 | 12 | |
| - L5/S1 | 8 | 10 | |
| Coronal angle | 9 deg | 0 | |
| - L1/2 | 2 | 0 | |
| - L2/3 | 10 | 0 | |
| - L3/4 | 0 | 0 | |
| - L4/5 | -3 | 0 | |
| - L5/S1 | 0 | 0 | |
| Assessment | yellow | green | Approval: XXX |

*FIG. 11*

SYSTEMS AND METHODS FOR DESIGNING ORTHOPEDIC IMPLANTS BASED ON TISSUE CHARACTERISTICS

RELATED APPLICATION

This application claims priority to U.S. Provisional Patent Application No. 62/928,909, filed on Oct. 31, 2019, and is also a continuation-in-part of U.S. patent application Ser. No. 16/569,494 filed on Sep. 12, 2019, now U.S. Pat. No. 11,696,833, issued on Jul. 11, 2023, which claims priority to U.S. Provisional Patent Application No. 62/730,336, filed Sep. 12, 2018. The disclosures of each of the foregoing applications are incorporated by reference herein in their entireties.

TECHNICAL FIELD

The present disclosure is generally related to systems and methods for designing orthopedic implants based on one or more tissue characteristics, and more particularly for designing implants based on a patient's tissue density, such as bone density.

BACKGROUND

Orthopedic implants are used to correct a variety of different maladies. Orthopedic surgery utilizing orthopedic implants may include one of a number of specialties, including: spine surgery, hand surgery, shoulder and elbow surgery, total joint reconstruction (arthroplasty), skull reconstruction, pediatric orthopedics, foot and ankle surgery, musculoskeletal oncology, surgical sports medicine, and orthopedic trauma. Spine surgery may encompass one or more of the cervical, thoracic, lumbar spine, or the sacrum, and may treat a deformity or degeneration of the spine, or related back pain, leg pain, or other body pain. Irregular spinal curvature may include scoliosis, lordosis, or kyphosis (e.g., hyper-kyphosis or hypo-kyphosis), and irregular spinal displacement may include spondylolisthesis. Other spinal disorders include osteoarthritis, lumbar degenerative disc disease or cervical degenerative disc disease, lumbar spinal stenosis or cervical spinal stenosis.

Spinal fusion surgery may be performed to set and hold purposeful changes imparted on the spine during surgery. Spinal fusion procedures include PLIF (posterior lumbar interbody fusion), ALIF (anterior lumbar interbody fusion), TLIF (transverse or transforaminal lumbar interbody fusion), or LLIF (lateral lumbar interbody fusion), including DLIF (direct lateral lumbar interbody fusion) or XLIF (extreme lateral lumbar interbody fusion).

The goal of interbody fusion is to grow bone between vertebra in order to seize the spatial relationships in a position that provides enough room for neural elements, including exiting nerve roots. An interbody implant device (or interbody implant, interbody cage, or fusion cage, or spine cage) is a prosthesis used in spinal fusion procedures to maintain relative position of vertebra and establish appropriate foraminal height and decompression of exiting nerves. Each patient may have individual or unique disease characteristics, but most implant solutions include implants (e.g. interbody implants) having standard mechanical properties, sizes or shapes (stock implants).

BRIEF DESCRIPTION OF THE DRAWINGS

FIG. 11 shows a representation of a surgical planning user interface.

DETAILED DESCRIPTION

Figure 1:
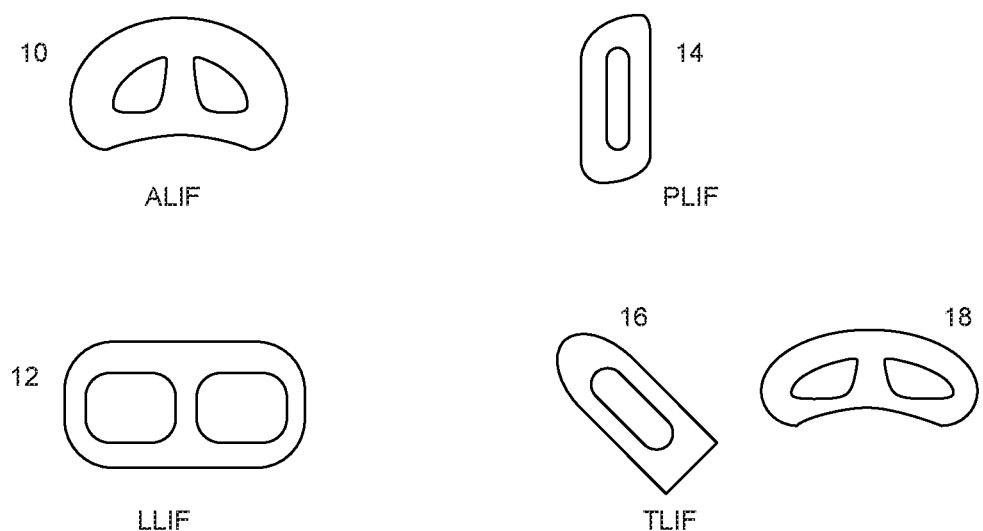
FIG. 1 shows a variety of interbody implants.

Systems and methods of producing a patient-specific interbody implant are described in the embodiments herein. Patient data can be obtained using, for example, imaging techniques. The patient data can include, without limitation, CT scans (e.g., 3D CT scans, CMCT scans, etc.), X-ray images, or other imaging data that provides tissue information. The tissue information can include tissue density data (e.g., bone density data, soft tissue density data, etc.), structure information (e.g., number of tissue layers, types of tissue layers, etc.), or the like. The patient data can be analyzed to design a patient-specific implant, surgical plan, surgical instruments, or the like. The analysis can include generating a virtual model of anatomy of interest and designing the patient-specific implant using the virtual model with encoded tissue data.

A treatment site can be imaged to capture and display the density of anatomical volumes throughout the patient. Image data can be combined into a volume where each voxel is displayed on a spectrum from, for example, light to dark. The value of the voxels can be rendered in units which can represent the density of the tissue at a location. In some embodiments, values of the voxels can be rendered in radiodensity units or Hounsfield units, and the dense tissue, such as bones, is displayed as a bright voxel. The relatively dense cortical tissue can be lighter than the less dense cancellous tissue. In some embodiments, pixels or voxels can be color coded to indicate tissue type or tissue density.

The density of the tissue as captured via imaging (e.g., one or more CT studies) can be used to generate the virtual anatomical model. In one embodiment, the cortical shell of a bone can be identified using the value of pixels that are typically between, for example, 1000 and 2000 HU. Properties can be assigned to corresponding tissue of the virtual model. The properties can include, without limitation, stiffness, modulus (e.g., Young's modulus), elasticity, strength (e.g., shear strength, tensile strength, compressive strength, etc.), buckling characteristics, fracture toughness, loadbearing capabilities, fatigue performance, and other properties and/or predicted performance characteristics of the patient's anatomical structures based on the property of the patient's tissue and dimensions of the imaged anatomic elements. By way of example, the loadbearing capabilities of vertebral endplates can be determined based on the dimensions of the endplate, density of the endplate bone, etc. A surgical plan can be generated based on the characteristics of the patient's anatomic elements and the patient specific implant. By modelling the components of bone (e.g., cortical and cancellous components), the virtual model can be used to select and design the orthopedic implant. In one embodiment, an orthopedic implant is configured to match the mechanical properties of adjacent anatomic features so as to create an interface that promotes to a desired biological response and/or mechanical performance. In one embodiment, if the anatomy is found to be compliant, an implant can be configured to be more compliant, thereby avoiding failure modes, such as subsidence. The mechanical properties of the orthopedic implant can be adjusted by modifying the density and location of lattice, struts, or other implant features.

The orthopedic spinal implants can include interbody implants, spacers, or fusion cages. Interbody implants are often configured to be placed in the space (created by surgical intervention) between two vertebrae. In fusion surgeries, the intervertebral disc may be surgically removed prior to the placement of the interbody implant. The lower (inferior) side of an interbody implant can be configured to abut at least a portion of an upper (superior) side of a first vertebrae and the superior endplate of the interbody implant is intended to abut at least a portion of an inferior endplate of a second vertebrae. The interbody implants can be expandable or non-expandable depending on the procedure.

Insufficient contact and load transfer between the vertebrae and the interbody implant can produce inadequate fixation. Inadequate fixation can allow movement of the implant relative to vertebrae. Furthermore, insufficient contact area or fixation between the interbody implant and the vertebrae can result in micro- and/or macro-motions that can reduce the opportunity for bone growth and fusion to occur. If enough motion occurs, expulsion of the interbody implant or subsidence of the interbody implant into the adjacent vertebrae can result. A patient-specific implant can minimize, limit, or substantially eliminate spinal motion.

Traditional implants are selected intraoperatively from a surgical kit containing likely sizes and shapes depending on the surgical approach and patient anatomy. Selection of implant size is performed by the surgeon during the surgery while the patient's spine is exposed. Often, minimal consideration is paid to implant size prior to the surgery. The method for selecting implant size is "trialing," whereby the surgeon uses a series of incrementally sized implant proxies to determine the appropriate implant size and shape. This method presents several opportunities for improvements.

Significant intra-operative attention is paid to the posterior height and sagittal angle of the interbody implants; however, minimal attention is paid to the lateral heights and coronal angle of the interbody implants. Even with the attention paid to the sagittal height, the implants available in surgery only come in stock sizes that are unlikely to provide optimal solutions for the particular patient or particular interbody space. Additionally, traditional stock implants do not provide any options for variable coronal angles. By selecting stock implants intraoperatively from a fixed assortment of implant sizes, the surgeon is unable to provide to the patient an optimal solution for correction of the particular spinal deformity or pathological malalignment causing patient pain.

Furthermore, intraoperative selection of stock implants requires shipment and delivery of sufficient implants to cover the wide variety of patients and their unique interbody spaces. The shipping, sterilization, processing, and delivery of enough implants to surgery can be characterized as logistically burdensome and expensive. It is not uncommon for more than fifty implants to be delivered to a surgery that requires only one implant.

In one typical fusion procedure, posterior fixation devices (pedicle screws, spinal rods) are used to stabilize the spine. Additionally, anterior interbody implants provide spacing and decompression of neural elements and a location for interbody fusion (bone growth between two vertebra).

Improper or sub-optimal sizing of interbody implants can result in implant failures. If the interbody space is not sufficiently filled, posterior implants (including rods and plates) are required to carry more dynamic loads prior to fusion. The typical failure mode of spinal rods include fracture due to dynamic loads; the increased magnitude of the movement due to an undersized interbody implant only exacerbates the condition, leading to more implant failures.

Patient-specific interbody implants can be designed for optimal fit in the negative space created by removal of the disc and adjustment of the relative position of vertebrae. Surgical planning software can be used to adjust the relative positions of vertebrae and define the negative space between the vertebrae. Modifying the spatial relationship between adjacent vertebrae within a virtual design space can provide a definition of the 3D negative space into which an interbody can be delivered. Software can further be used to compare the original pathology to the corrected positions of the vertebrae. The optimal size and shape of patient-specific implants can prevent or reduce instances of dynamic failure of posterior implants.

Presently, intraoperative imaging requires radiation. It is known that exposure to radiation should be reduced as low as reasonably possible. Surgeries using stock interbody implants require trialing to inform the selection of the stock implant. Patient-specific implants do not require trialing, as the size and shape of the implant has been determined prior to the surgery using preoperative imaging and planning software.

The imaging tools available to the surgeon during surgery typically only include mobile radiography (bedside x-ray, c-arm, o-arm). The use of mobile radiography exposes surgeons, staff, and patients to intraoperative radiation. The operating room environment does not provide the same radiation shielding capabilities as a standard dedicated radiology room (e.g., a radiology room with leaded walls, leaded glass, etc.). Because of the desire to reconcile radiographic images with visible (and invisible) anatomy, avoid sensitive anatomy, and understand relative anatomical positions, surgeons are often in close proximity to or within the field of radiation during intraoperative imaging. It is advantageous to reduce or eliminate radiation exposure to the participants of surgery.

One method of designing patient-specific interbody implants includes capturing important anatomical geometry and relative positioning using computed tomography (CT) or another imaging modality (MRI, simultaneous bi-planar radiography, etc.). The image data can be reconstructed into volumetric data containing voxels that are representative of anatomy. Following the scan, the collected data can be ported to a workstation or portable computer with software to enable segmentation of relevant anatomy. A process called segmentation separates voxels representing bony anatomy from the other anatomy. Isolation of individual bony structures enables a user to appreciate each bony structure independently. Furthermore, following isolation, the relationships between individual vertebrae (distances, angles, constraints, etc.) can be manipulated. Together with a surgeon, an engineer can manipulate the vertebrae thereby changing the spacing between the virtual anatomical structures. Manipulations can include translations along an axis or curve, rotation about an axis or centroid, or rotation about the center of mass, among other movements. Consideration is to be paid to the virtual manipulations to ensure they are representative of anatomical constraints and manipulations that can be achieved in a surgical setting. After the virtual manipulations of select vertebrae, the newly created negative space between the vertebrae can be mapped and characterized using design software. One way of mapping the negative 3D space is to (1) select a bounding anatomical feature, such as a vertebral endplate, (2) create a best-fit plane through the surface, (3) define a perimeter of the anatomical feature, and (4) extrude a volume defined by the perimeter and perpendicular to the best-fit plane to the interface of another anatomical feature.

The newly created negative space between virtual vertebrae can be used to determine geometric parameters (dimensions, angles, heights, surfaces, topographies, footprints, etc.) and external envelope for optimal interbody implants.

After the external envelope for the patient-specific interbody (PSIB) implant has been determined, internal features, including lattice, struts, and apertures, can be designed. The internal features will determine the strength and bone incorporation qualities. Internal features can be engineered to provide favorable conditions for osteo-integration, bony on-growth, bony in-growth, and bony through-growth. Internal features can also be designed to resist or allow deformation, resulting in an optimal structural stiffness or compliance according to the physiological demands. In some patients, reducing the strength (stiffness) of the implant may create less instances of implant subsidence into the neighboring bones. In other patients, a stronger or stiffer implant may be designed to handle larger anticipated anatomical loads.

In some embodiments, a system and computer-implemented method for manufacturing an orthopedic implant involves segmenting features in an image of anatomy. The features can be anatomy of interest, such as bone, organs, etc. Anatomic elements (e.g., vertebrae, vertebral disks, etc.) can be isolated. Spatial relationships between the isolated anatomic elements can be manipulated. Before and/or after manipulating the spatial relationships, a negative space between anatomic elements can be mapped. At least a portion of the negative space can be filled with a virtual implant. The virtual implant can be used to select, design, and/or manufacture a patient-specific implant.

FIG. 1 shows a variety of interbody implants that can be configured to transfer loads to suitable load-bearing regions of vertebral bodies. Each of the implants is surgically inserted using different anatomical approaches. ALIF (Anterior Lumbar Interbody Fusion) implant 10 is inserted from the anterior, through an incision in the abdomen. LLIF (Lateral Lumbar Interbody Fusion) implant 12 is inserted from a lateral direction, through an incision in the side. PLIF (Posterior Lumbar Interbody Fusion) implant 14 is inserted from a posterior direction, through an incision in the back. TLIF (Transforaminal Lumbar Interbody Fusion) implant 16 is also inserted from a posterior direction, through an incision in the back. The PLIF device is typically inserted parallel to the sagittal plane. The TLIF device is typically inserted through a neural foramen on a trajectory that is oblique to the sagittal plane. The configuration of the interbody implants can be selected to apply loads to regions of the vertebral body, annular epiphysis, ring apophysis, endplate, cortical rim, central depression, or like. For example, the interbody implants can be configured to transfer loads between cortical bone or other high-density tissue.

Figure 2:
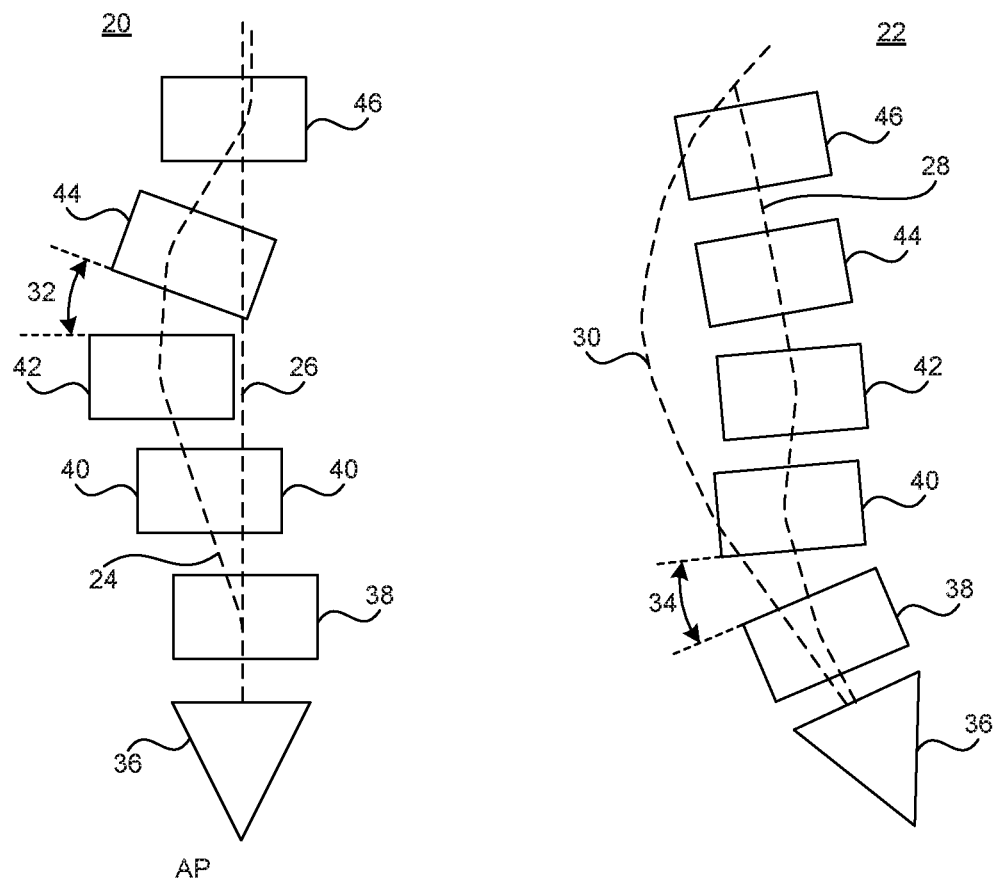
FIG. 2 shows a representation of a spine with a pathological deformity such as adult degenerative scoliosis.

FIG. 2 shows representations of a lumbar spine with adult degenerative scoliosis when viewed in the coronal plane 20 and sagittal plane 22. Sacrum 36 and lumbar vertebrae L5 38, L4 40, L3 42, L2 44, and L1 46 are shown in both coronal view 20 and sagittal view 22. Lumbar curvatures (coronal 24, sagittal 28) drawn through vertebrae centroids can be used to characterize the deformity of the spine. Additionally, angles between vertebrae 32, 34 can also be used to characterize deformities. Ideal coronal curvature 26 and sagittal curvature 30 can be superimposed on the Anterior-Posterior (AP) view 20 and Lateral (LAT) view 22.

Figure 3:
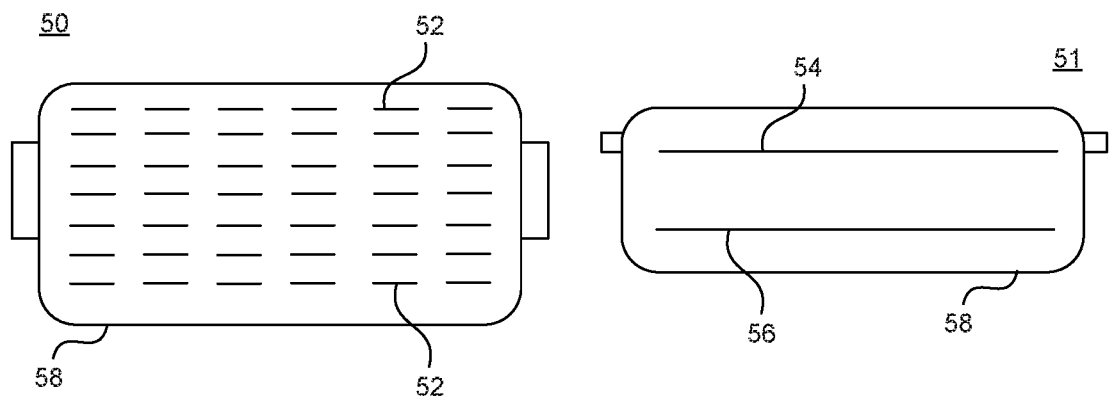
FIG. 3 shows a representation of a typical surgical implant kit containing stock implants delivered to spinal surgery.

FIG. 3 shows a representative stock interbody kit that is typically delivered to a single surgery. Top view 50 depicts a tray 54 containing the matrix of interbody implants 52. Side view 51 show trays 54, 56 that contain implants and instruments to be used in surgery. Each kit is contained within a steam sterilization case and trays 54, 56 that allow for steam to penetrate the case and sterilize the contents. The number of stock implants 52 contained within kit 50 can number over one-hundred. Instruments contained within kit 58 can be greater than twenty.

Figure 4:
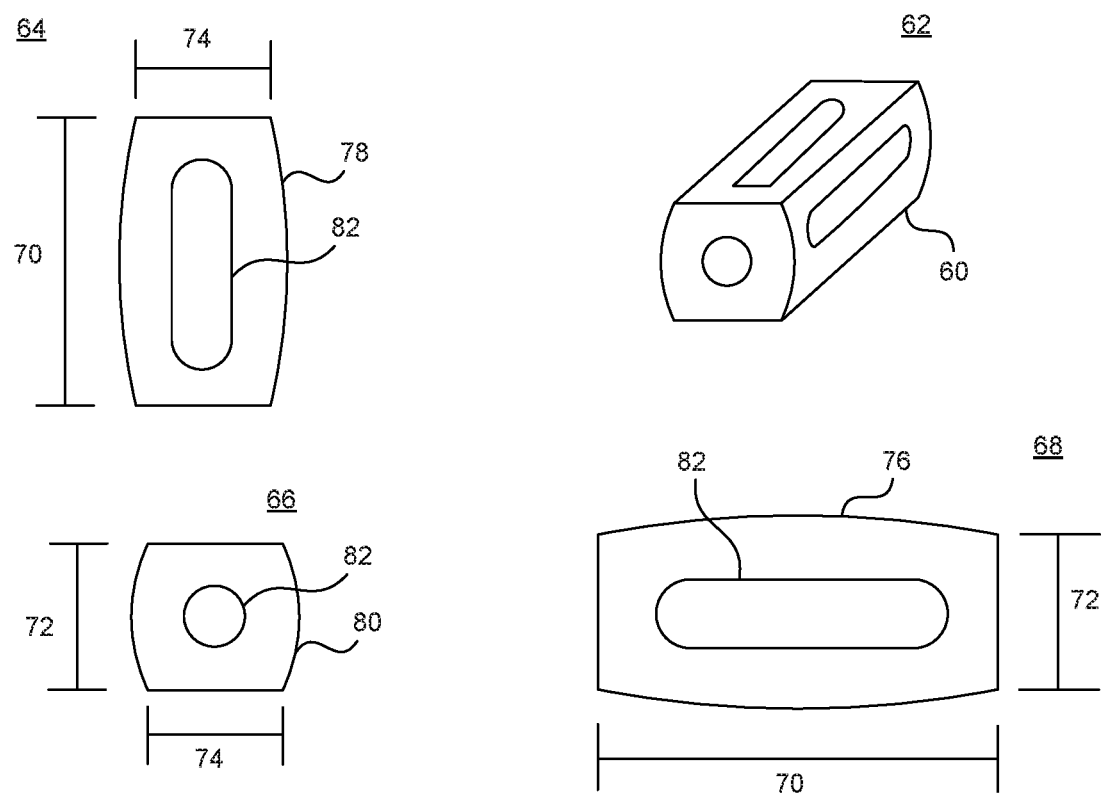
FIG. 4 shows a representation of a typical stock implant including several views.

FIG. 4 shows four views of a typical stock implant 60 (isometric 62, top 64, front 66, side 68 views). Length 70, width 74, and height 72 are fundamental dimensions that define the overall envelope for stock implants. Additionally, curvatures and radii 76, 78, 80 can further describe the implant geometry. Also depicted in stock implant 62 are apertures 82 that allow bone to grow from adjacent vertebral endplates through the implant for fusion thereby completing fusion of adjacent vertebrae.

Each stock implant has several dimensions that vary for a specific instance of an implant (length, width, height, curvatures, radii, etc.). Although these dimensions are infinitely variable, space, logistics and expense limit inclusion of all instances within a surgical kit 50.

Figure 5:
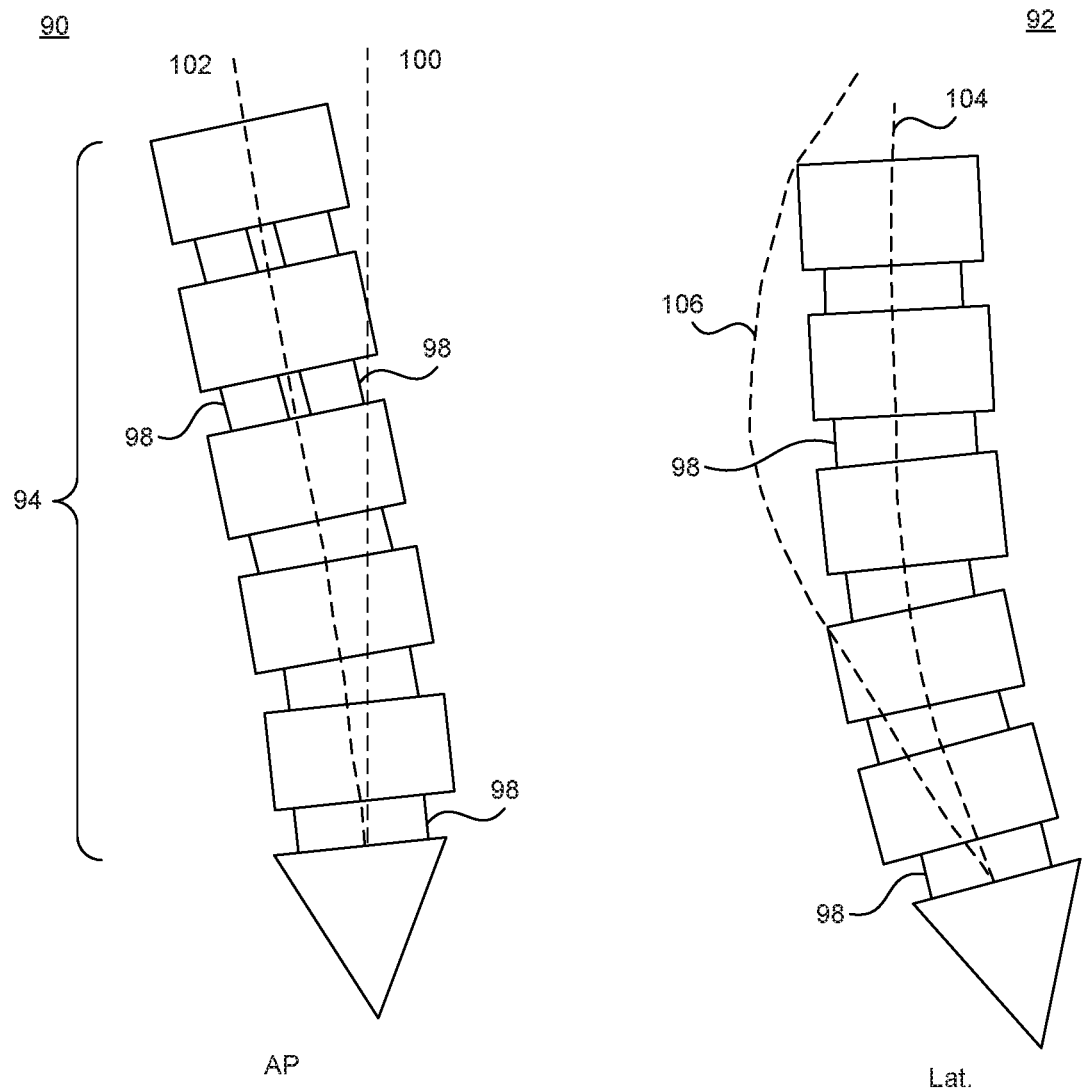
FIG. 5 shows a representation of a spine with a pathological deformity that has been surgically corrected with traditional stock interbodies.

FIG. 5 shows the spine 94 from FIG. 2 as treated with stock interbody implants. Implants 98 are positioned between the vertebrae during surgery to correct the spinal deformity. Due to the inability to provide all possible variations of stock implants to each surgery, correction of a complex deformity is limited by the selection of implants from an existing matrix of instances. Since each deformity is unique to the patient, correction of the deformity using stock implants is necessarily suboptimal.

As seen in FIG. 5, suboptimal coronal and sagittal deformities can still exist following surgery. The post-surgical coronal curvature 100 deviates from the optimal coronal curvature 102. Additionally, the post-surgical sagittal curvature 104 deviates from the optimal sagittal curvature 106. Pathological curvatures and associated pain are the proximal reasons for undergoing surgery. If correction of the curvature is not achieved, the patient remains at risk for continued pain. One method of providing correction to pathological curvatures is to implant devices that, when incorporated into the spinal column, re-align the spine to the appropriate curvature and relieve patient symptoms. AP 90 and lateral view 92 depicts five interbody implants 98 that aim to correct the complex deformity, realign the spine, and/or relieve pain. If stock implants 98 are not properly sized and shaped, the curvature (and associated pain) may remain. Stock implants 98 cannot provide the optimal amount of correction due to the limited nature of the offering during surgery.

Figure 6:
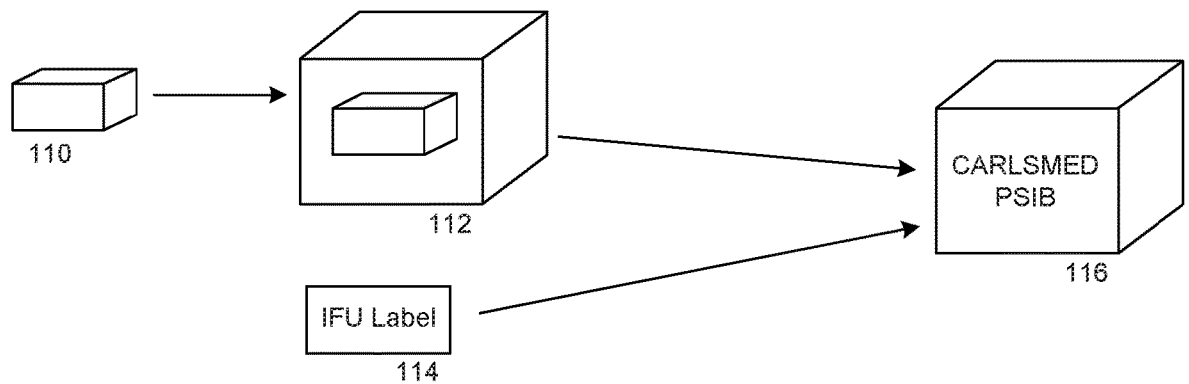
FIG. 6 shows a representation of a patient specific-implant and packaging as delivered to spinal surgery.

FIG. 6 shows a patient-specific interbody contained within packaging. In one embodiment, implant 110 is inserted into one or many sterilization envelopes 112 that can be sterilized and opened during surgery. Label 114 and other required identifying documents can be included with the packaging or affixed to the sterilization envelopes 112 to identify implant 110. Identification can include patient identifier, surgeon identifier, geometric parameters, spinal level for insertion, method of insertion, and date of surgery among other pieces of data. These items can be sent to the PSIB.

Figure 7:
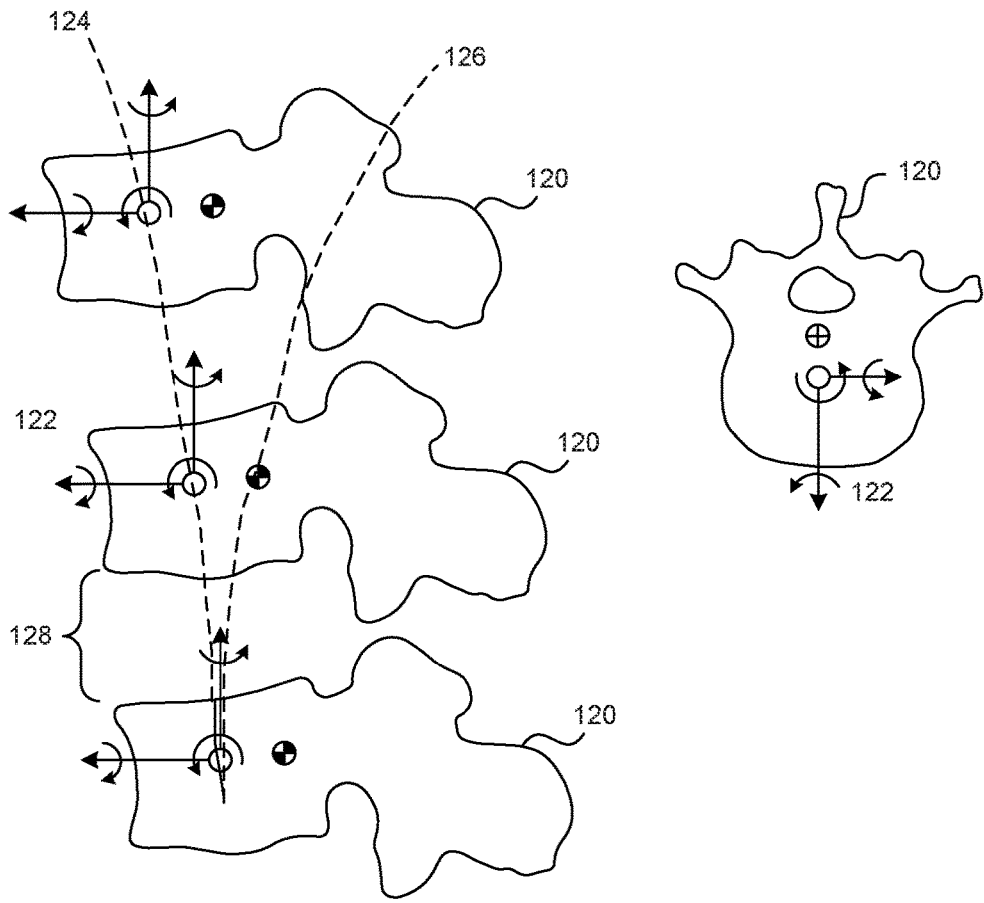
FIG. 7 shows isolated lumbar vertebrae and coordinate systems to guide adjustment of relative positions between vertebrae.

FIG. 7 shows lumbar vertebrae, coordinate frames, and lumbar curvatures 124, 126. Vertebrae 120 is shown in relation to other lumbar vertebrae. The relationships between the vertebrae is often the cause of patient pain and subsequent surgical intervention. Often adult degenerative scoliosis or another pathology cause the vertebrae to exert pressure on neural elements, causing patient pain. Correction of positioning or re-aligning of the vertebrae can alleviate pain. The goal of the surgery is to re-align the vertebrae, remove pressure on the nerves, and fuse the vertebrae in place to provide lasting relief of pressure on the nerves.

Vertebrae 120 can be moved along coordinate systems 122 as defined by the user. Manipulations can occur as (1) translations along predetermined or user-defined axis, (2) rotations about predetermined or user-defined axis, (3) translations along predetermined or user-generated curves, and (4) rotations about predetermined or user-generated curves.

In one embodiment, coordinate systems 122 based on the centroid for each vertebra is displayed in order to facilitate manipulation of each vertebrae. In another embodiment, curvatures representing a best-fit curve between centroids of adjacent vertebrae is created. Another curve representing the optimal curvature of vertebrae can be used to manipulate vertebrae. A 'snap' feature can cause the vertebrae aligned in pathological conditions to automatically be positioned on a desired curve that represents optimal alignment for a patient.

In another embodiment, intersections between virtual solid models can be calculated. Where intersections or overlap of bony anatomy is detected by the planning software, they can be resolved by an engineer, technician, or physician. Anatomical constraints, such as facet joint mobility, angles of facet articulating surfaces, and articulating surface size, must be considered during the alignment of virtual vertebrae. By manipulating the virtual models of vertebrae, the negative three-dimensional space between the vertebrae can be appreciated. After correction of the virtual vertebrae has occurred, the negative space that results from the correction can be described. The description of the negative space can be used to inform the design of the interbody implant. The interfaces between virtual solid models can be analyzed to generate properties for the patient specific implant. For multi-material implants, sections of the implant can have material properties selected based on the characteristics of tissue to be contacted.

Figure 8:
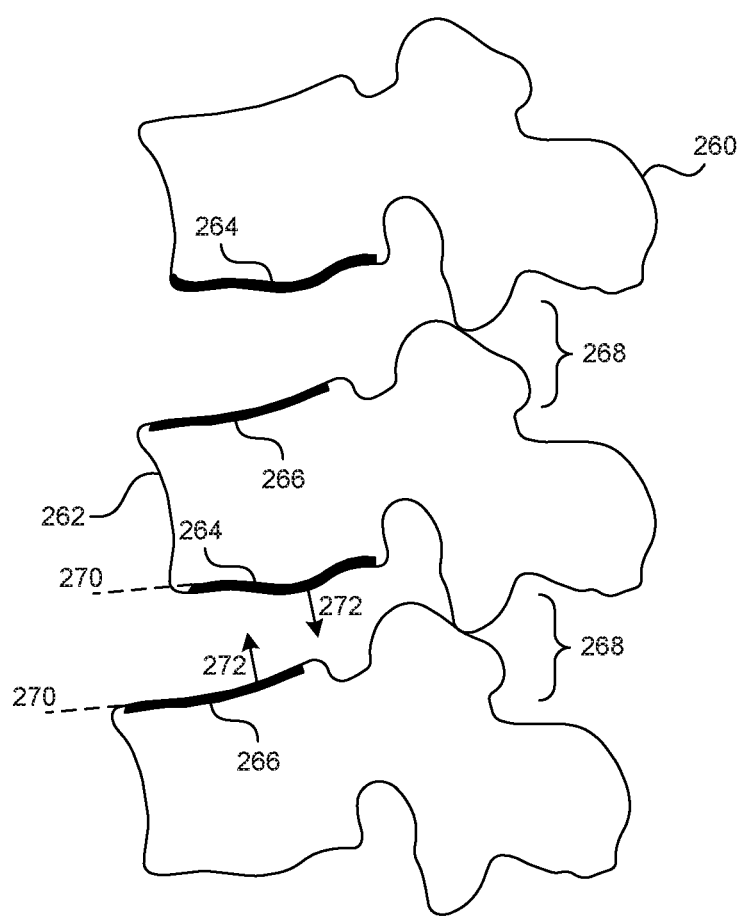
FIG. 8 shows three lumbar vertebrae and highlighted vertebral endplates.
Figure 9:
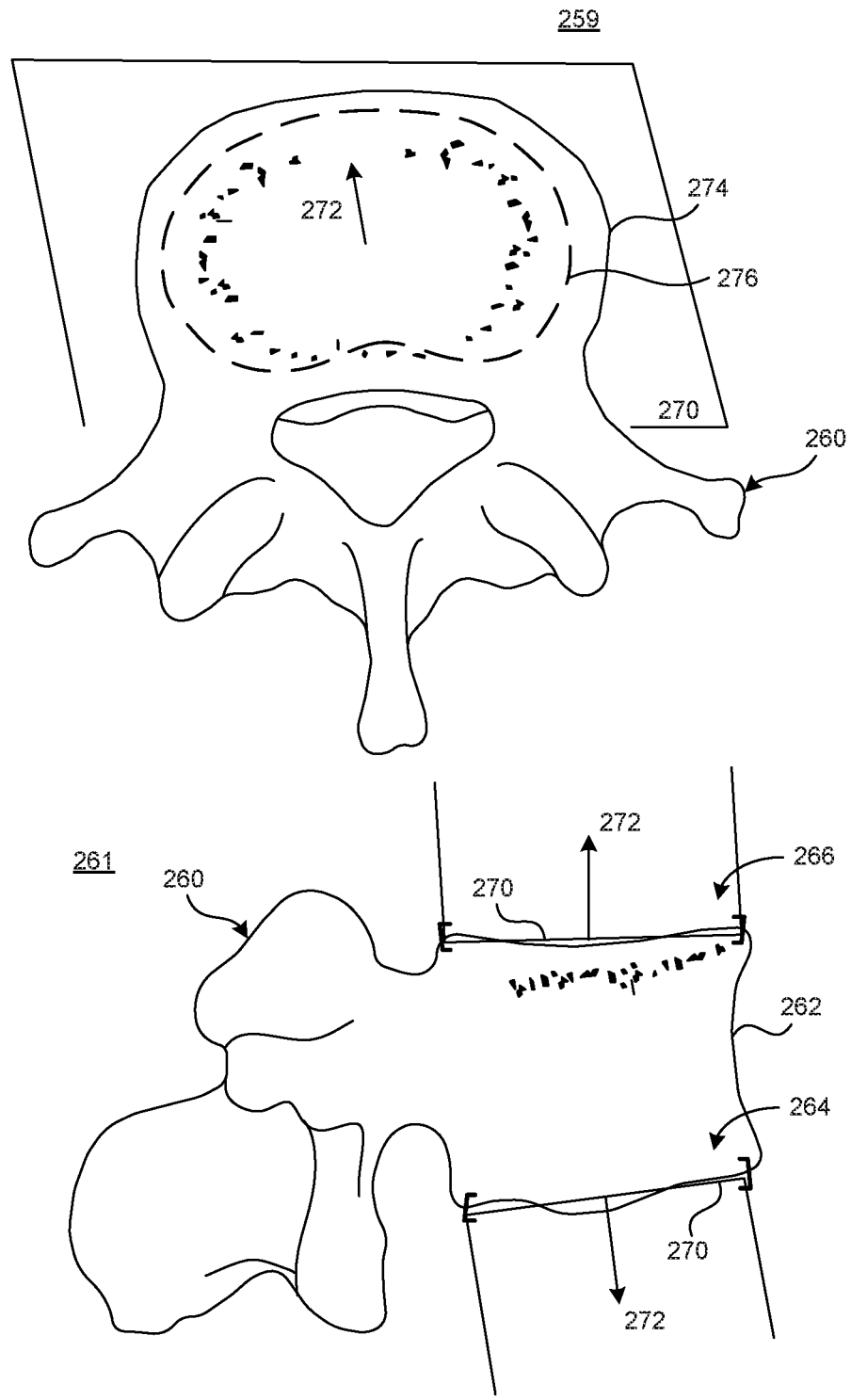
FIG. 9 shows top and side views of a vertebra.

FIG. 8 shows three lumbar vertebra and highlighted vertebral endplates. FIG. 9 shows an individual vertebra as shown in axial 259 and lateral 261 views. Vertebrae 260 have features including an anterior vertebral body 262 containing endplates. Emphasis has been added to endplates in order to appreciate the anatomical bounding features 264, 266 which can be used to define the negative 3D volume between vertebral bodies. Facet joint 268 restricts motion between vertebra. In order to appreciate the 3D volume between the vertebrae, a best-fit plane 270 can be passed through the anatomical bounding features 264, 266. Vector 272, perpendicular to best-fit plane 270, can be constructed to provide direction for extruding a volume. Perimeter 274 can be drawn on plane 270. Perimeter 274 can be extruded to opposing endplates 264, 266 or bounding anatomical features to define the negative 3D space. A portion of the negative 3D space 276 can be used to describe an implant 216.

In one embodiment, implant boundary 276 can be drawn on plane 270 to represent an external shape of implant 216. Boundary 274 can be projected from plane 270 to opposing anatomical endplates 264, 266 to define the 3D shape of implant 216.

Implant 216 can be manufactured using one or more additive manufacturing or subtractive (traditional) manufacturing methods. Additive manufacturing methods include, but are not limited to: three-dimensional printing, stereolithography (SLA), selective laser melting (SLM), powder bed printing (PP), selective laser sintering (SLS), selective heat sintering (SHM), fused deposition modeling (FDM), direct metal laser sintering (DMLS), laminated object manufacturing (LOM), thermoplastic printing, direct material deposition (DMD), digital light processing (DLP), inkjet photo resin machining, and electron beam melting (EBM). Subtractive (traditional) manufacturing methods include, but are not limited to: CNC machining, EDM (electrical discharge machining), grinding, laser cutting, water jet machining, and manual machining (milling, lathe/turning).

Figure 10:
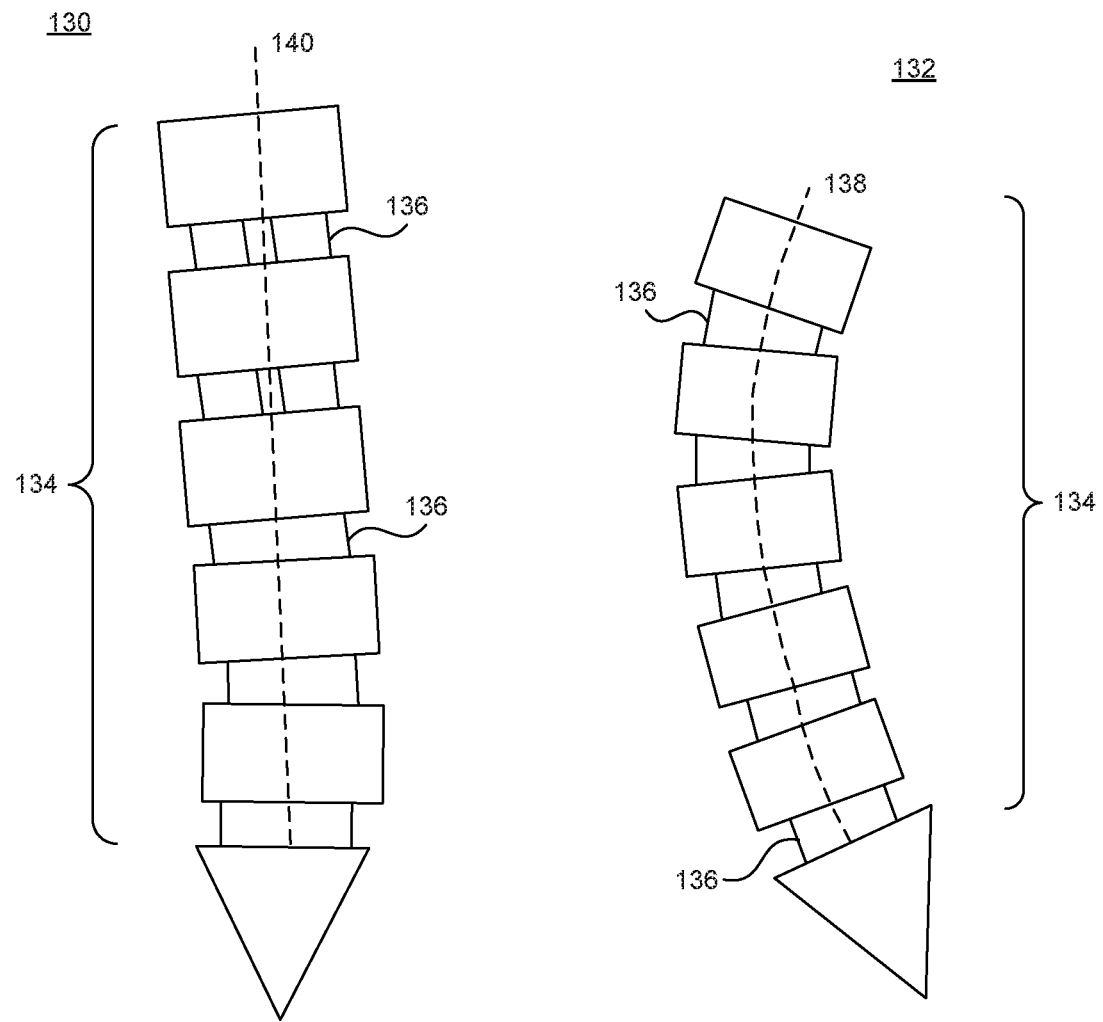
FIG. 10 shows a representation of a spine with a pathological deformity that has been surgically corrected with patient-specific interbodies.

FIG. 10 shows AP 130 and lateral 132 images of a lumbar spine that has been treated with patient-specific implants. The curves 138, 140 through the vertebrae of the lumbar spine 134 show that optimal alignment has occurred following placement of patient-specific interbodies 136. The manipulation of the virtual vertebrae has aligned the vertebrae. In this embodiment, the negative space between each vertebra can be optimally filled with virtual interbody implants. The parameters of the implants can be used to manufacture each interbody implant. Each implant can be manufactured using 3D printing. The implants can be packaged (including identifiers, labels, and instructions), sterilized, and delivered to surgery.

FIG. 11 shows a graphical display of a surgical planning software application. In one embodiment, software planning application 150 displays graphical and text information in several panes (152-166). In patient information pane 152, information about the patient, surgeon, and surgery can be displayed. Metric pane 154 can display parameters of interest to the user. Information like anatomical metric fields (pelvic incidence, lumbar lordosis, angle between vertebrae, distance between vertebrae, disc height, sagittal vertical axis, sacral slope, pelvic tilt, Cobb angle, etc.) can be selected and displayed.

Three columns containing six panes 156, 158, 160, 162, 164, 166 can be used to easily compare pathologic anatomy and corrected anatomy. In one embodiment, a column displaying information about the pathology with panes 156, 158 can show a virtual model of the spine 156 above the relative metrics of that spine 158. The displayed spine can be rotated (zoomed, panned, etc.) to better display areas of interest. Another column containing panes 160, 162 can display images and information (anatomic metrics) about the corrected spine and patient-specific implants in place.

The right column containing pane 164 can display images of pathological and corrected spine superimposed upon each other. The displayed spines can be rotated (zoomed, panned, etc.) to better display areas of interest. Pane 166 can display some important specifications of the patient-specific interbody implants, including posterior height, sagittal angle, coronal angle, anterior-posterior length, and width.

Figure 12:
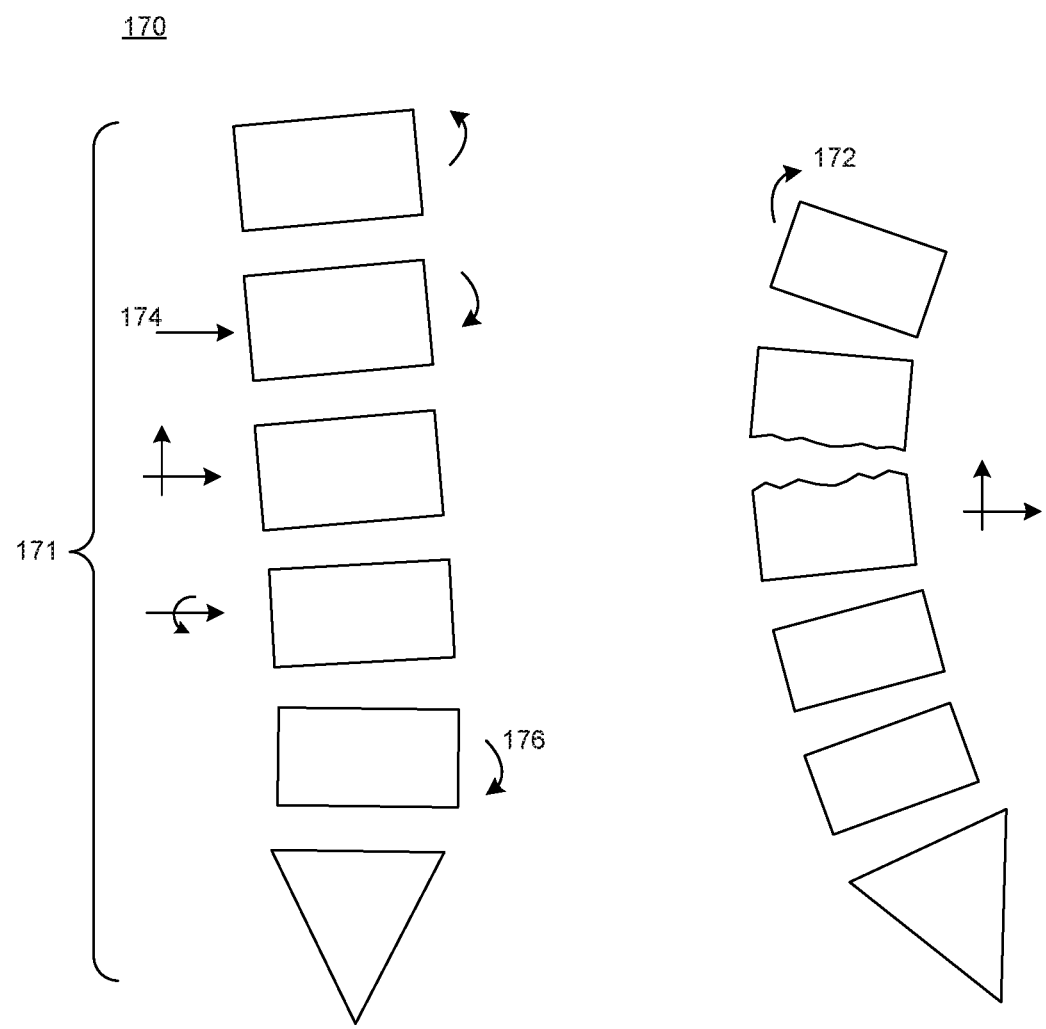
FIG. 12 shows a representation of a surgical planning user interface with tools to enable relative adjustments of vertebrae positioning.

FIG. 12 shows a lumbar spine 171 and graphical representations of the corrective maneuvers required to align the spine. AP 170 and lateral 172 images can be shown in order to provide the clinician with a better understanding of the correction that is required to reposition the spine in alignment. Arrows 174, 176 represent manipulations, maneuvers, rotations, or translations that will bring the spine back into alignment.

Figure 13:
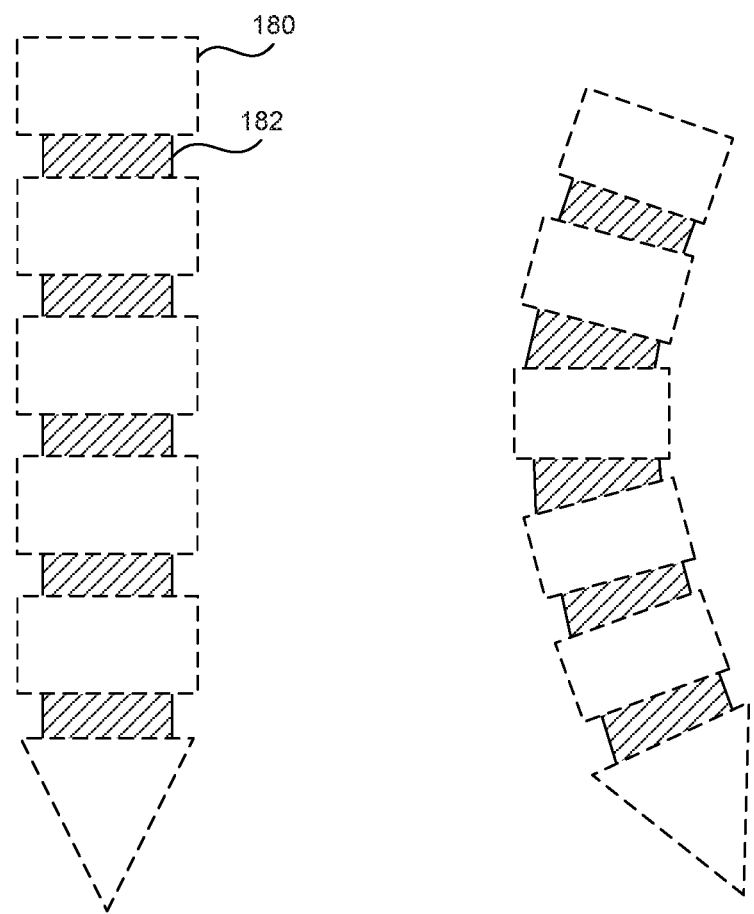
FIG. 13 shows a representation of a lumbar spine with the negative space between the vertebrae highlighted.

FIG. 13 shows the corrected spine with the patient-specific interbody implants in place. Each interbody implant 182 is highlighted while the corrected anatomy 180 is displayed as semi-transparent to allow for improved appreciation of the design of each implant. The images can be rotated, panned, or zoomed to provide better visibility to areas of interest.

Figure 14:
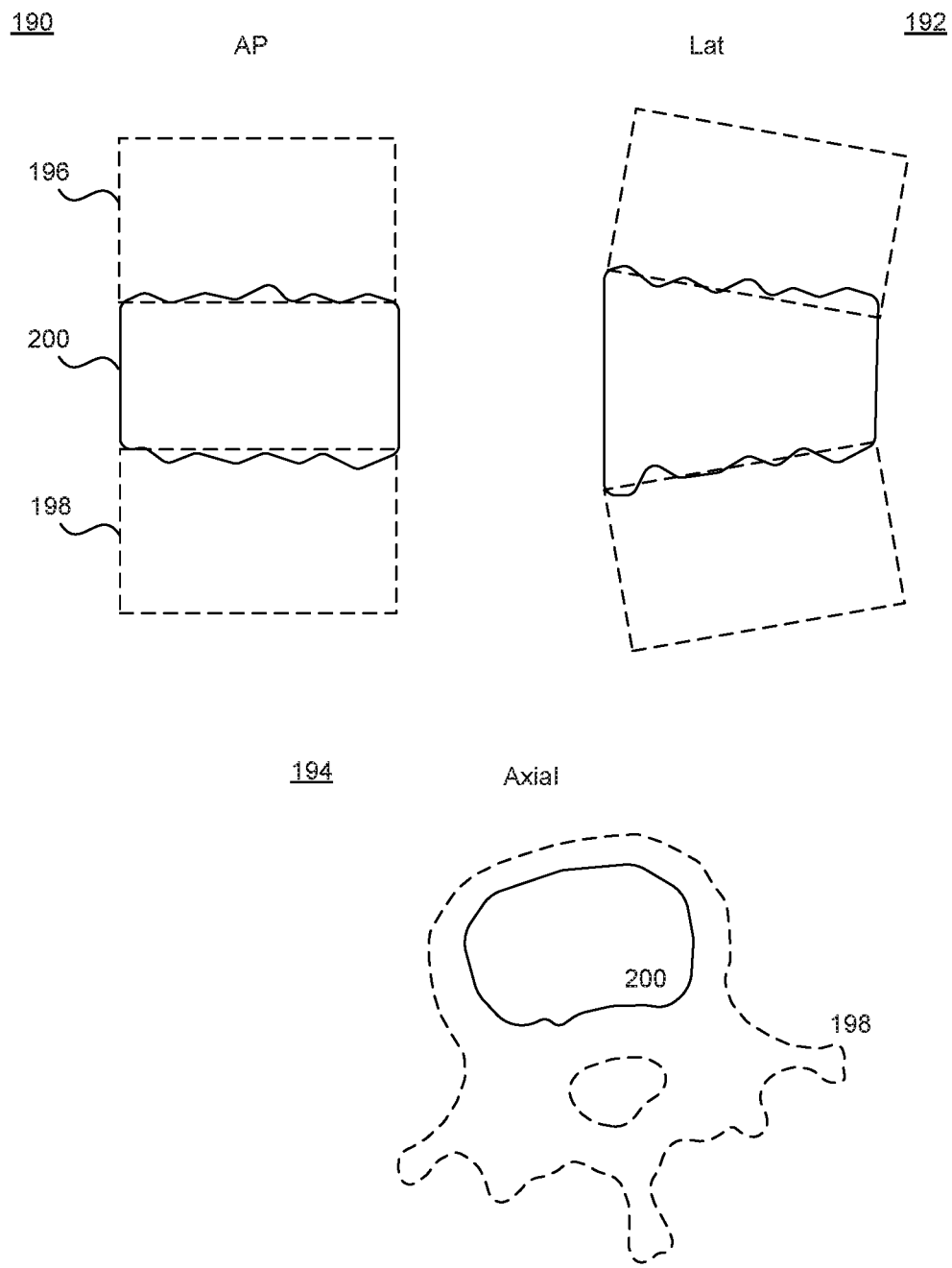
FIG. 14 shows the details of an individual negative space resulting from the adjustment of the relative positions of the vertebrae.

FIG. 14 shows an individual vertebral motion segment comprised of a superior vertebra 196, inferior vertebra 198, and patient-specific interbody (PSIB) implant 200. Three views (AP 190, lateral 192, and axial 194) are shown. PSIB 200 is shown in place with the adjacent vertebrae.

Figure 15:
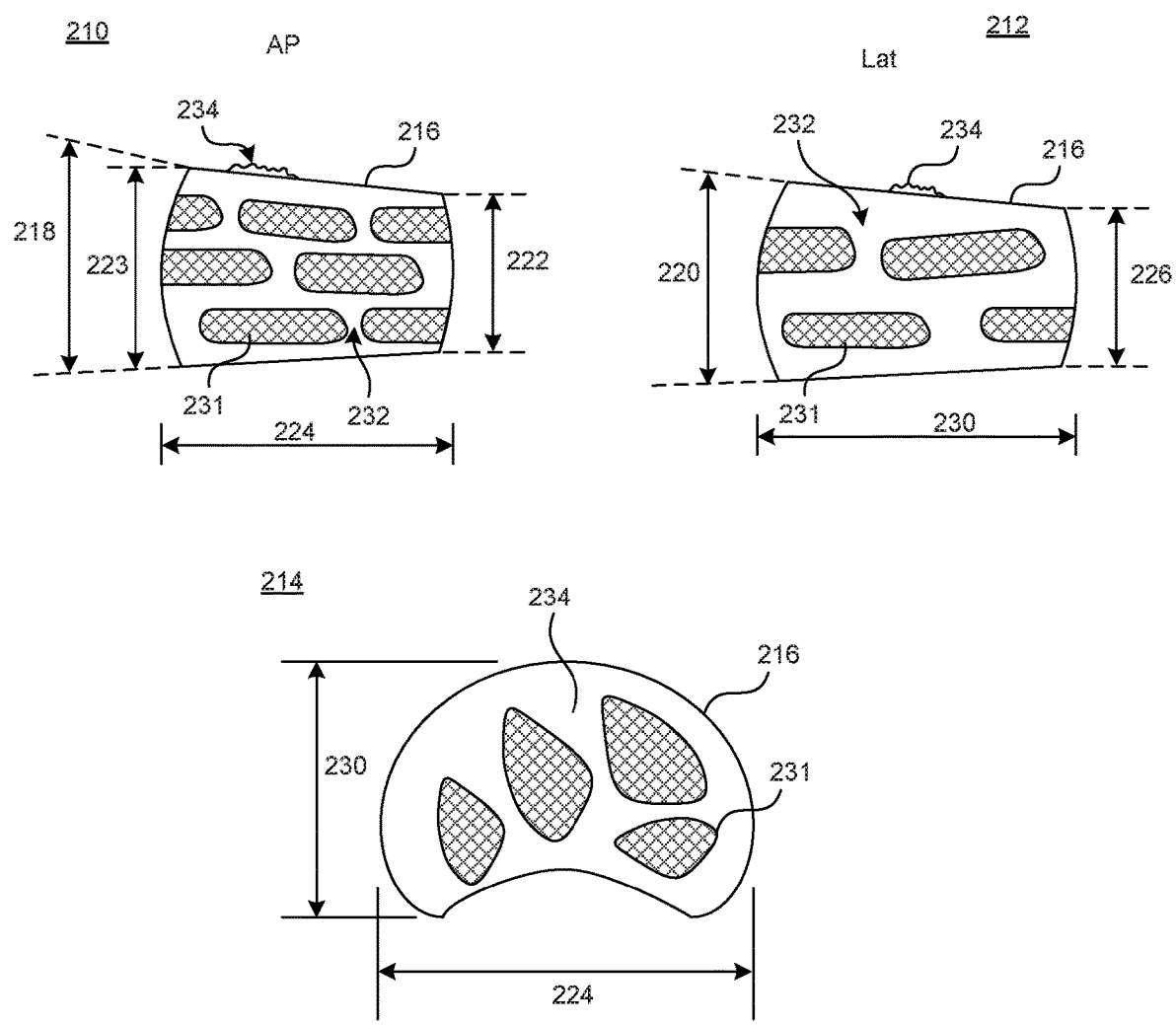
FIG. 15 shows the details of an individual patient-specific implant designed to fill at least a portion of the negative space including bi-planar angulation and endplate topography.

FIG. 15 shows the patient-specific interbody (PSIB) implant 216 displayed in AP 210, lateral 212, and axial 214 views. The PSIB 216 is generated from the three-dimensional negative space created by manipulation of the virtual vertebra into an aligned position.

In each view, several dimensions are shown including, coronal angle 218, sagittal angle 220, left lateral height 222, right lateral height 223, width 224, posterior height 226, and anterior-posterior depth 230. Structural elements or struts 232 can be seen in the AP and lateral views 210, 212. Additionally, internal lattice 231 is shown. Lattice 231 can be designed to resist compressive loads and reduce incidences of subsidence in patients with reduced bone density, including patients with osteoporosis.

The properties of the implant 216 can generally match the properties of the vertebrae, thereby reducing or limiting the incidences of subsidence along the endplates, vertebral fracture, or other damage to the vertebral bodies. In some embodiments, the implant 216 has nonuniform properties, for example, along the width 224, posterior height 226, and/or anterior-posterior depth 230.

The mechanical properties of internal lattice 231 can be selected based on the mechanical properties of the vertebral body. For example, the internal lattice 231 can have a modulus of elasticity that is generally similar to the modulus of elasticity of the vertebral endplates. For example, the modulus of elasticity of the internal lattice 231 can be within at least 10%, 5%, or 2.5% of the modulus of elasticity of one or both vertebral endplates. Additionally, the implant 216 can be configured to have a stiffness that is generally similar to the stiffness of the adjacent vertebra. For example, a ratio of the stiffness of the implant to the stiffness of an adjacent vertebra can be in a range from 0.8 to 1.2, 0.9 to 1.1, or other suitable ranges. In some embodiments, the stiffness of the implant can be substantially equal to the stiffness of the adjacent vertebra. The number, size, and locations of the internal lattice regions 231 can be selected based on the desired loading. For patients with low density vertebral bodies (e.g., patients with osteoporosis), the number and size of the internal lattice regions 231 can be adjusted, thereby increasing the overall compressibility of the implant 216. The structural elements or struts 232 can be located at the periphery of the implant 216 to transfer loads between annular epiphysis of adjacent vertebral bodies. The properties of the struts 232 and/or internal lattice structures 231 can be selected based on the analysis of patient data. Another feature of PSIB 216 is endplate topography 234. The endplate of the implant can be designed to match the irregular surface of the adjacent vertebral endplate. The topography can have macro- or micro-geometry to encourage fit, fixation, and fusion to the adjacent vertebral endplate. The endplate topography 234 can be configured to apply pressure to one or more selected regions of the vertebral body.

In another embodiment, surfaces of the patient-specific interbody implant can be configured to encourage bone growth. It has been shown in clinical literature that structures having a particular pore size can encourage attachment of cells that become a precursor for bone formation. One embodiment can be configured to have the appropriate pore size to encourage bone formation.

Additionally, surfaces of the implant can be impregnated with therapeutic agents including anti-inflammatory compounds, antibiotics, or bone proteins. The impregnation could occur as a result of exposing the implant to solution containing the therapeutic agents, manufacturing therapeutic agents into the substrate or surface material, coating the implant with a therapeutic solution, among other methods. In one embodiment, the therapeutic agents can be configured for a timed release to optimize effectiveness.

Figure 16:
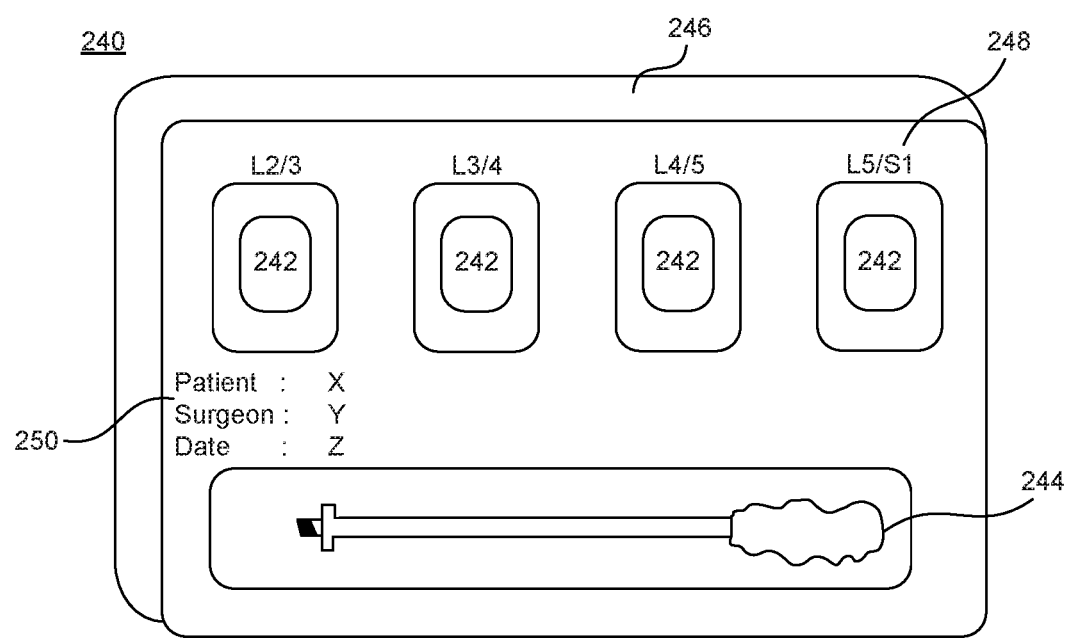
FIG. 16 shows the contents of one embodiment of a patient-specific surgical implant kit, including implants and implant inserter.

FIG. 16 shows a surgical kit 240 including implants 242, instrument 244, and packaging 246. Surgical kit 240 can be assembled and delivered sterile to the operating room. In one embodiment, patient-specific interbodies 242 can be arranged in individual wells with identifiers 248 including level to implanted, external dimensions, and implant strength. Additional data 250 including patient identifier, surgeon identifier, and surgery date can be included in the data. Display of translation, rotation, manipulations to inform surgeon of amount and direction of correction expected in order to reach optimal alignment.

Figure 17:
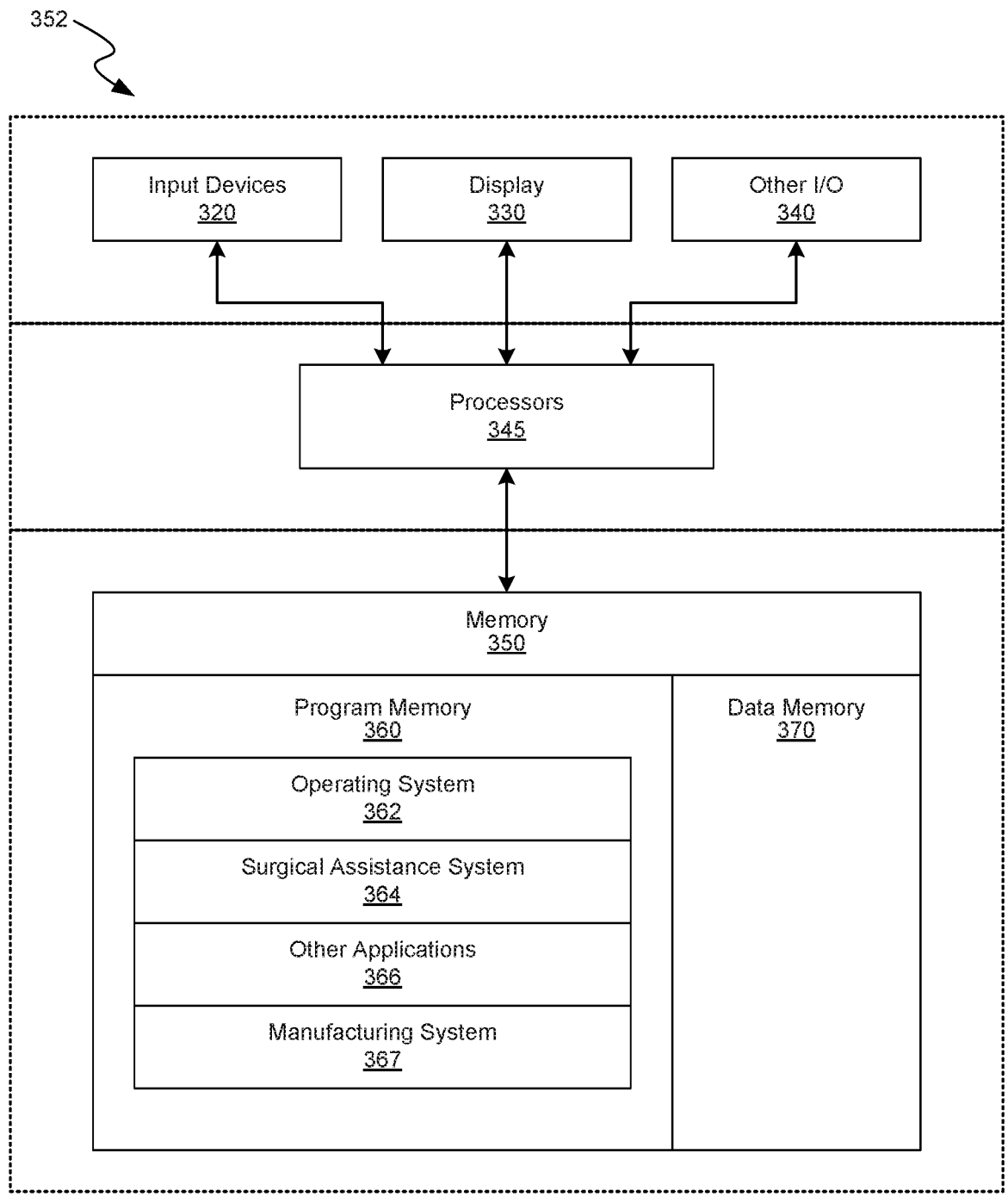
FIG. 17 illustrates a system for providing assistance for manufacturing a patient specific-implant.

FIG. 17 illustrates a system 352 for providing assistance for manufacturing a patient-specific implant. The system 352 can include a surgical assistance system 364 that obtains implant surgery information (e.g., digital data, images of anatomy, correction procedure data, etc.), converts the implant surgery information into a form compatible with an analysis procedure, applies the analysis procedure to obtain results, and uses the results to manufacture the patient-specific implant. In some embodiments, the surgical assistance system 364 analyzes image data of a patient to identify at least one tissue characteristic at different locations along anatomic elements of anatomy of interest. The tissue characteristic can include, without limitation, tissue density, tissue elasticity, tissue structure, tissue strength (e.g., ultimate tensile strength, compressive strength, etc.), fracture toughness, yield strength, or combinations thereof. The surgical assistance system 364 can analyze image data to evaluate the load-bearing capabilities of bones that will contact the implant. The configuration of the implant can be determined based on load-bearing characteristics of the bones. In some embodiments, the configuration of the implant is selected such that the implant applies forces/pressure to suitable regions of anatomic elements. Different regions of the implant can therefore have properties selected based on corresponding regions of the anatomic elements they different regions are configured to contact. For example, regions of the implant contacting load bearing regions of the anatomic elements can have load bearing characteristics, such as a relatively high compressive strength.

In some embodiments, the surgical assistance system 364 determines characteristics of tissue at or proximate to the treatment site. The surgical assistance system 364 can simulate interaction between the tissue and implants for one or more corrective procedures. The implants can be redesigned any number of times based on user set criteria. The surgical assistance system 364 can determine the size, shape, or properties (e.g., number of materials, material properties, surface finishes, etc.) of the implant based on predicted interaction, simulated patient outcome, and/or other design criteria. To design implants using tissue data, the patient images can be segmented to identify anatomic elements, tissue boundaries, tissue types (e.g., cartilage, bone, nerve tissue, connective tissue, etc.), tissue density, tissue mass, etc. Segmented regions can be assigned characteristics based on identified tissue type, tissue location, tissue density, tissue structure, patient data, etc. A user can assign characteristics to any misidentified tissue.

The patient-specific implant can be designed based on the tissue analysis. For example, mechanical properties of the implant contacting bone can be selected to generally match the mechanical properties of the bone. Alternatively, the properties of the implant can be selected to match the properties of an anatomical structure(s) it replaces. For example, an articulating vertebral disk can be designed to have a compressibility similar to a patient's intervertebral disk to be replaced.

In some embodiments, a user can manipulate a virtual model to provide a target correction to an anatomy of interest in the patient. For example, a user can manipulate a virtual model of a patient's anatomy to reflect a desired or corrected anatomical configuration. The patient-specific implant can be designed based on the tissue characteristics of anatomic elements to achieve the desired correction. AI/ML module(s) can be used to design the patient-specific implant based on the virtual model. The modules can evaluate the patient data to assign properties to the virtual model. Virtual implants can be generated to perform corrective procedures simulated using the virtual model. As a non-limiting example, in relation to treating a degenerative disk disease, a user may manipulate one or more patient vertebrae in a virtual model to increase a distance between adjacent vertebral endplates. The manipulated position reflects the desired or corrective anatomical configuration. The system then generates an implant that, when implanted provides the desired anatomical correction.

The surgical assistance system 364 can analyze CT scans (e.g., 3D CT scans), CMCT scans, X-ray images, or other imaging data to determine tissue information. The tissue information can include tissue density (e.g., bone density, soft tissue density, etc.), tissue structure (e.g., number of tissue layers, types of tissue layers, dimensions of layers, uniformity of properties throughout the layer, etc.), or the like. The patient data can be analyzed to design a patient-specific implant, treatment plan, surgical tools, or the like. The analysis can include generating a virtual model of the anatomy of interest and designing the patient specific implant using the virtual model virtual. Additionally or alternatively, the analysis can include using machine learning model and/or artificial intelligence.

The surgical assistance system 364 can process images to generate tissue density images. The tissue density images can be generated, based on the density of anatomical volumes throughout the patient, a module or volume in which each voxel is displayed on a spectrum from, for example, light to dark. The value of the voxels can be rendered in units (e.g., radiodensity units, Hounsfield units, etc.) that represent the density of the tissue at a location. In some embodiments, value of the voxels can be rendered in Hounsfield units, and the dense anatomy, such as bones, is displayed as a bright voxel. The relatively dense cortical tissue can be lighter than the less dense cancellous bone tissue. In some embodiments, pixels or voxels can be color coded to indicate tissue type, tissue properties, etc.

The patient-specific implant can be designed to provide a patient-tailored corrective spine procedure that accommodates any number of underlying diseases or conditions (e.g., osteoporosis, arthritis, rickets, osteogenesis imperfecta, etc.), including progressive diseases. The surgical assistant system 364 can also identify bone tissue affected by underlying conditions, such as bone diseases. A boundary or identification marker can be used to indicate a weakened region of the vertebrae. The surgical assistant system 364 can determine predicted bone strength based on the characteristics of weakened region. The patient-specific implant can be configured based on the disease tissue. For example, the loadbearing area of the implant can be increased to distribute the loads applied to the weakened vertebrae and/or avoid contacting weakened regions of the vertebrae. In addition to increasing the size of the implant, the implant can include compliant regions to limit forces applied to highly porous regions affected by the osteoporosis.

In some embodiments, the surgical assistant system 364 can design implants based on progression of diseases. For example, if a patient suffers from osteoporosis, the implant can be designed based on a modeled or predicted progression of the osteoporosis. The rate of progression of disease can be a variable rate (e.g., the rate of progression may increase as the patient ages) or fixed (e.g., the rate of progression remains generally constant). The rate of progression can be determined using trained models, inputted by a user, or both. For example, in some embodiments the rate of progression of disease can be determined using trained models that can analyze disease progression data for patient's having one or more similarities with the target patient (e.g., age, sex, height, weight, disease, starting bone density, diet, activity-level, etc.). In some embodiments, the rate of progression can be based on estimates of disease progression (e.g., an annual percent decrease in tissue strength, density, etc., such as 0.3%, 0.5%, 0.7%, 1.0%, 2.0%, 3.0%, 4.0%, 5.0%, 10.0%, etc.). If patient images taken over a period of time are available, the images can be compared and analyzed to determine a rate of disease progression. The rate of disease progression over the period of time can be used to determine future tissue characteristics used to design the implant. In some embodiments, the surgical assistant system 364 evaluates changes in tissue properties based on the age of the patient. For example, bones can be modeled as weakening as the subject ages. Future tissue characteristics can be assigned to the model to perform simulations at different patient ages. This also allows a user to perform simulations at different points in time after the surgery. Even in a compliant procedure, the simulations can be performed based on additional data acquired by healthcare provider. This can compensate for abnormal disease progression at any point in time. Accordingly, the implant can be designed with material properties that inhibits or prevents fracture of the adjacent bone over the entire service life of the implant.

In one embodiment, the cortical shell of a bone can be identified using the value of pixels that are between, for example, 1000 and 2000 HU. One or more mechanical properties can be assigned to the virtual model of the cortical shell. By modelling the components (e.g., cortical and cancellous components) of bone, the virtual model can be used to inform the model of the orthopedic implant. In one embodiment, an orthopedic implant can be configured to match the mechanical properties of adjacent anatomy so as to create an interface that promotes a preferred biological response and mechanical performance. In one embodiment, an implant can be configured to be more compliant than tissue it contacts, thereby avoiding failure modes, such as subsidence. The difference in compliance (e.g., 20%, 10%, 5%, etc.) can be selected by the surgical assistant system 364 or the user. In embodiments in which the surgical assistant system 364 selects the difference, a user may optionally review and approve the selected compliance. At implantation sites where the likelihood of bone failure (e.g., fracture, crushing, etc.) of load bearing bone is to be substantially reduced, the implant can be designed to be at least 20% more compliant than the bone. Additionally or alternatively, the implant can be designed for catastrophic failure prior to catastrophic failure of the anatomic element, thereby preserving the structure of the anatomic element. Additionally, the different material properties can be selected based on the implantation site and additional procedures to be performed. The mechanical properties of the orthopedic implant can be adjusted by modifying the density and location of load-bearing features, including lattice or struts. The surgical assistance system 364 can be trained to identify different types of tissues based on different values of pixels. The surgical assistance system 364 can determine characteristics of virtual anatomic elements in the virtual model based on the properties and parameters of the imaged anatomic elements of patient. The determine characteristics can include, without limitation, compressive strength.

The implant can be configured to provide load transfers. For spine fixation procedures, the implant can transfer loads between adjacent vertebral bodies while providing adequate fixation to substantially prevent, minimize, or limit relative motion (e.g., micro-motions and/or macro-motions), thereby promoting bone growth, fusion, or the like. Additionally, the implant can contact suitable load bearing regions of the vertebrae to substantially prevent, minimize, or limit subsidence of vertebral bodies. For non-spine procedures, the implant can be designed based on criteria selected based on the procedures to be performed. Knee replacement implants can be designed to interface with bone, soft tissue, and bear significant loads when articulating.

The system 352 can segment an image of anatomy to isolate anatomic elements. The segmentation can be based upon tissue densities for identifying compact bone, cancellous bone tissue, bone marrow, tissue with specific properties (e.g., tissue with a density higher or lower than a preset level). Filtering or thresholding can be performed to identify bone tissue with a density at or above pre-selected level. Segmentation can also be based on tissue type. Spatial relationships between the isolated anatomic elements can be manipulated and negative spaces between anatomic elements can be analyzed or mapped for configuring a virtual implant. In some embodiments, the system 352 can analyze one or more images of the subject to determine an virtual implant configuration, which can include characteristics, such as mechanical properties, parameters (e.g., dimensions), materials, angles, application features (e.g., implant sizes, implant functionality, implant placement location, graft chamber sizes, etc.), and/or aspects of applying the implant such as insertion point, delivery path, implant position/angle, rotation, amounts of force to apply, etc.

A patient-specific implant can be manufactured based, at least in part, on the virtual implant configuration selected for the patient. Each patient can receive an implant that is specifically designed for their anatomy, including bone densities, tissue characteristics, etc. In some procedures, the system 352 can handle the entire design and manufacturing process. In other embodiments, a physician can alter the implant configuration for further customization. An iterative design process can be employed in which the physician and system 352 work together. For example, the system 352 can generate a proposed patient-specific implant. The physician can identify characteristics of the implant to be changed and can input potential design changes. The system 352 can analyze the feedback from the physician to determine a refined patient-specific implant design and to produce a patient-specific model. This process can be repeated any number of times until arriving at a suitable design. Once approved, the implant can be manufactured based on the selected design.

The surgical assistance system 364 can analyze implant surgery information, for example, images, scans tissue characteristic data, loading profiles (e.g., desired pressure distributions, force application sites, etc.), force loading maps, arrays of integers or histograms, segments images of anatomy, manipulates relationships between anatomic elements, converts patient information into feature vectors, or extracts values from the pre-operative plan. The system 352 can store implant surgery information analyzed by the surgical assistance system 364. The stored information can include received images of a target area, such as MRI scans of a spine, CT scans, digital images, X-rays, patient information (e.g., sex, weight, etc.), virtual models of the target area, a databased of technology models (e.g., CAD models), and/or a surgeon's pre-operative plan.

In some implementations, the surgical assistance system 364 can analyze patient data to identify or develop a corrective procedure, identify anatomical features, etc. The anatomical features can include, without limitation, vertebra, vertebral discs, bony structures, or the like. The surgical assistance system 364 can determine the implant configuration based upon, for example, a corrective virtual model of the subject's spine, risk factors, surgical information (e.g., delivery paths, delivery instruments, etc.), or combinations thereof. In some implementations, the physician can provide the risk factors before or during the procedure. Patient information can include, without limitation, patient sex, age, bone density, health rating, or the like.

In some implementations, the surgical assistance system 364 can apply analysis procedures by supplying implant surgery information to a machine learning model trained to select implant configurations. For example, a neural network model can be trained to select implant configurations for a spinal surgery. The neural network can be trained with training items each comprising a set of images (e.g., camera images, still images, scans, MRI scans, CT scans, X-ray images, laser-scans, etc.) and patient information, an implant configuration used in the surgery, and/or a scored surgery outcome resulting from one or more of: surgeon feedback, patient recovery level, recovery time, results after a set number of years, etc. This neural network can receive the converted surgery information and provide output indicating the pedicle screw configuration.

The assistance system 364 can generate one or more virtual models (e.g., 2D models, 3D models, CAD models, etc.) for designing and manufacturing items. For example, the surgical assistance system 364 can build a virtual model of a surgery target area suitable for manufacturing surgical items, including implants. The surgical assistance system 364 can also generate implant manufacturing information, or data for generating manufacturing information, based on the computed implant configuration. The models can represent the patient's anatomy, implants, candidate implants, etc. Tissue density, modules of elasticity, fracture toughness, strength, or other tissue characteristics can be assigned to features of the model. The tissue characteristics can be selected or generated based upon stored data, patient data, or the like. Additionally, the model can be updated based on patient specific information. For example, a relatively low fracture toughness can be assigned to bones in the model representing a patient susceptible to bone fractures. Customization of virtual models can be performed to accurately represent the patient's anatomy.

The model can be used to (1) simulate loading of implants and/or anatomical features, (2) evaluate locations (e.g., map a negative 2D or 3D space), (3) select a bounding anatomical feature, such as a vertebral endplate, (4) create a best-fit virtual implant, (5) define a perimeter of the anatomical feature, and/or (6) extrude a volume defined by the perimeter and perpendicular to, for example, a best-fit plane to the interface of another anatomical feature. Anatomical features in the model can be manipulated according to a corrective procedure. Implants, instruments, and surgical plans can be developed based on the pre or post-manipulated model. Neural networks can be trained to generate and/or modify models, as well as other data, including manufacturing information (e.g., data, algorithms, etc.).

In another example, the surgical assistance system 364 can apply the analysis procedure by performing a finite element analysis on a generated three-dimensional model to assess, for example, stresses, strains, deformation characteristics (e.g., load deformation characteristics), fracture characteristics (e.g., fracture toughness), fatigue life, etc. The surgical assistance system 364 can generate a three-dimensional mesh to analyze the model. Machine learning techniques to create an optimized mesh based on a dataset of vertebrae, bones, implants, tissue sites, or other devices. After performing the analysis, the results could be used to refine the selection of implants, implant components, implant type, implantation site, etc.

The surgical assistance system 364 can perform a finite element analysis on a generated three-dimensional model (e.g., models of the spine, vertebrae, implants, etc.) to assess stresses, strains, deformation characteristics (e.g., load deformation characteristics), fracture characteristics (e.g., fracture toughness), fatigue life, etc. The surgical assistance system 364 can generate a three-dimensional mesh to analyze the model of the implant, anatomy, etc. Based on these results, the configuration of the implant can be varied based on one or more design criteria (e.g., maximum allowable stresses, fatigue life, etc.). Multiple models can be produced and analyzed to compare different types of implants, which can aid in the selection of a particular implant configuration. Material properties can be selected based on the analysis of the patient's anatomy. In some embodiments, the modulus or stiffness of the loadbearing regions of the implant is selected to be generally similar to the modulus or stiffness of the loadbearing regions of the anatomy.

The surgical assistance system 364 can incorporate results from the analysis procedure in suggestions. For example, the results can be used to suggest a surgical plan (e.g., a PLIF plan, a TLIF plan, a LLIF plan, a ALIF plan, etc.), select and configure an implant for a procedure, annotate an image with suggested insertions points and angles, generate a virtual reality or augmented reality representation (including the suggested implant configurations), provide warnings or other feedback to surgeons during a procedure, automatically order the necessary implants, generate surgical technique information (e.g., insertion forces/torques, imaging techniques, delivery instrument information, or the like), etc. The suggestions can be specific to implants. In some procedures, the surgical assistance system 364 can also be configured to provide suggestions for conventional implants. In other procedures, the surgical assistance system 364 can be programmed to provide suggestions for patient-specific or customized implants. The suggestion for the conventional implants may be significantly different from suggestions for patient-specific or customized implants.

The system 352 can simulate procedures using a virtual reality system or modeling system. One or more design parameters (e.g., dimensions, implant configuration, instrument, guides, etc.) can be adjusted based, at least in part, on the simulation. Further simulations (e.g., simulations of different corrective procedures) can be performed for further refining implants. In some embodiments, design changes are made interactively with the simulation and the simulated behavior of the device based on those changes. The design changes can include material properties, dimensions, or the like.

The surgical assistance system 364 can improve efficiency, precision, and/or efficacy of implant surgeries by providing more optimal implant configuration, surgical guidance, customized surgical kits (e.g., on-demand kits), etc. This can reduce operational risks and costs produced by surgical complications, reduce the resources required for preoperative planning efforts, and reduce the need for extensive implant variety to be prepared prior to an implant surgery. The surgical assistance system 364 provides increased precision and efficiency for patients and surgeons.

In orthopedic surgeries, the surgical assistance system 364 can select or recommend implants, surgical techniques, patient treatment plans, or the like. In spinal surgeries, the surgical assistance system 364 can select interbody implants, pedicle screws, and/or surgical techniques to make surgeons more efficient and precise, as compared to existing surgical kits and procedures. The selection can be based on the geometry and/or tissue characteristics of the patient's spine. The surgical assistance system 364 can also improve surgical robotics/navigation systems, and provide improved intelligence for selecting implant application parameters.

For example, the surgical assistance system 364 empowers surgical robots and navigation systems for spinal surgeries to increase procedure efficiency and reduce surgery duration by providing information on types and sizes, along with expected insertion angles. In addition, hospitals benefit from reduced surgery durations and reduced costs of purchasing, shipping, and storing alternative implant options. Medical imaging and viewing technologies can integrate with the surgical assistance system 364, thereby providing more intelligent and intuitive results.

The surgical assistance system 364 can include one or more input devices 420 that provide input to the processor(s) 345 (e.g., CPU(s), GPU(s), HPU(s), etc.), notifying it of actions. The input devices 320 can be used to manipulate a model of the spine, as discussed in connection with FIGS. 10 and 11. The actions can be mediated by a hardware controller that interprets the signals received from the input device and communicates the information to the processors 345 using a communication protocol. Input devices 320 include, for example, a mouse, a keyboard, a touchscreen, an infrared sensor, a touchpad, a wearable input device, a camera- or image-based input device, a microphone, or other user input devices. Processors 345 can be a single processing unit or multiple processing units in a device or distributed across multiple devices. Processors 345 can be coupled to other hardware devices, for example, with the use of a bus, such as a PCI bus or SCSI bus.

The system 352 can include a display 330 used to display text, models, virtual procedures, surgical plans, implants, graphics, and/or images (e.g., images with voxels indicating radiodensity units or Hounsfield units representing the density of the tissue at a location). A clinician can evaluate a recommended implant configuration based on the displayed information. In some implementations, display 330 provides graphical and textual visual feedback to a user. In some implementations, display 330 includes the input device as part of the display, such as when the input device is a touchscreen or is equipped with an eye direction monitoring system. The processors 345 can communicate with a hardware controller for devices, such as for a display 330. In some implementations, the display is separate from the input device. Examples of display devices are: an LCD display screen, an LED display screen, a projected, holographic, or augmented reality display (such as a heads-up display device or a head-mounted device), and so on. Other I/O devices 340 can also be coupled to the processors 345, such as a network card, video card, audio card, USB, firewire or other external device, camera, printer, speakers, CD-ROM drive, DVD drive, disk drive, or Blu-Ray device. Other I/O 340 can also include input ports for information from directly connected medical equipment such as imaging apparatuses, including MRI machines, X-Ray machines, CT machines, etc. Other I/O 340 can further include input ports for receiving data from these types of machine from other sources, such as across a network or from previously captured data, for example, stored in a database.

In some implementations, the system 352 also includes a communication device capable of communicating wirelessly or wire-based with a network node. The communication device can communicate with another device or a server through a network using, for example, TCP/IP protocols. System 352 can utilize the communication device to distribute operations across multiple network devices, including imaging equipment, manufacturing equipment, etc.

The system 352 can include memory 350. The processors 345 can have access to the memory 350, which can be in a device or distributed across multiple devices. Memory 350 includes one or more of various hardware devices for volatile and non-volatile storage, and can include both read-only and writable memory. For example, a memory can comprise random access memory (RAM), various caches, CPU registers, read-only memory (ROM), and writable non-volatile memory, such as flash memory, hard drives, floppy disks, CDs, DVDs, magnetic storage devices, tape drives, device buffers, and so forth. A memory is not a propagating signal divorced from underlying hardware; a memory is thus non-transitory. Memory 350 can include program memory 360 that stores programs and software, such as an operating system 362, surgical assistance system 364, and other application programs 366. Memory 350 can also include data memory 370 that can include, e.g., implant information, configuration data, settings, user options or preferences, etc., which can be provided to the program memory 360 or any element of the system 352, such as the manufacturing system 367. The system 452 can be programmed to perform the methods discussed in connection with FIGS. 18 and 19 to manufacture implants using the manufacturing system 367.

Figure 18:
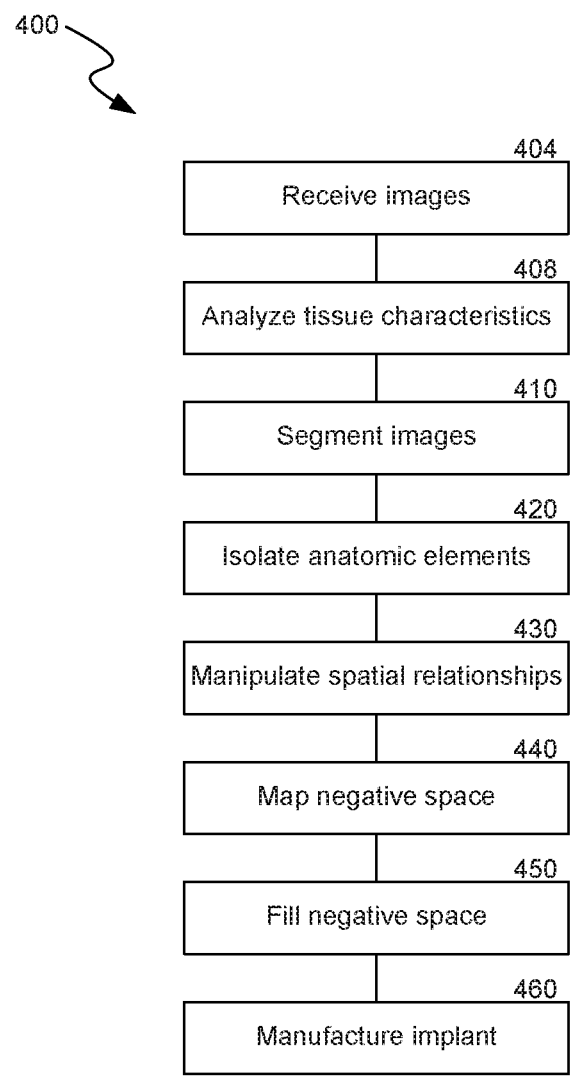
FIG. 18 is a flow diagram illustrating a method for manufacturing an implant in accordance with an embodiment.

FIG. 18 is a flow diagram illustrating a method 400 for manufacturing an implant in accordance with an embodiment of the disclosure. At block 404, one or more images of anatomy are received. At block 408, the images are analyzed to evaluate tissue characteristics. At block 410, features in images can be segmented. The features can be anatomy of interest, such as bone, organs, etc. Anatomic elements (e.g., vertebrae, vertebral disks, etc.) can be isolated at block 420. At block 430, spatial relationships between the isolated anatomic elements can be manipulated. Before and/or after manipulating the spatial relationships, a negative space between anatomic elements can be mapped at block 440. At block 450, at least a portion of the negative space can be filled with a virtual implant. At block 460, the virtual implant can be used to select, design, and/or manufacture a patient-specific implant (e.g., implant 110 of FIG. 6). The virtual implant can be designed based on the tissue characteristics assigned to the anatomic elements.

Figure 19:
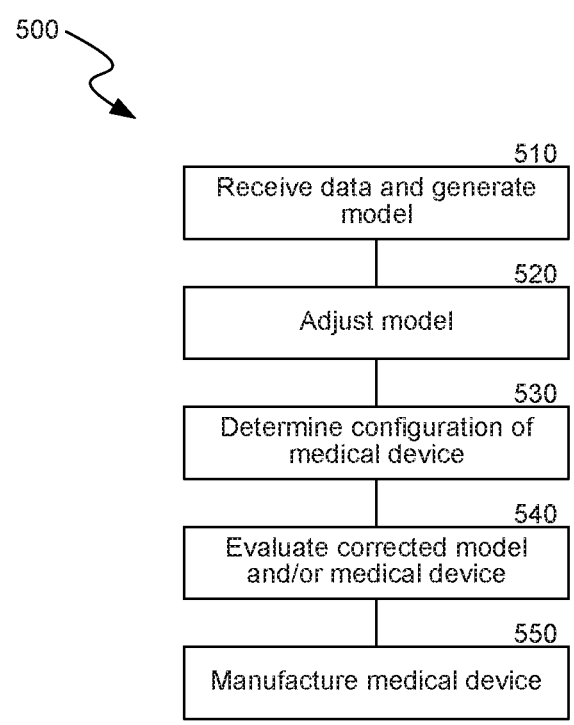
FIG. 19 is a flow diagram illustrating a method for manufacturing an implant in accordance with another embodiment.

FIG. 19 is a flow diagram illustrating a method 500 for manufacturing an implant in accordance with an embodiment of the disclosure. At block 510, a system can receive patient data and generate a patient-specific model based on the received patient data. At block 520, the patient-specific model can be adjusted according to one or more corrective procedures to produce a corrected model. The corrected model can be used to design a patient specific medical device. In some embodiments, the corrected model can be a 2D or 3D anatomical model of the patient's spine, vertebral column, etc. At block 530, dimensions of a virtual implant/medical device can be determined using the corrected model. For example, the configuration of the virtual implant/medical device can be determined by positioning a virtual implant/medical device at a desired location (e.g., an implantation site in the corrected model). Material properties can be assigned to the virtual implant/medical based on the tissue properties at the implantation site. The material properties can be selected to compensate for variations in tissue characteristics. At block 540, once positioned, the corrected anatomical model and/or virtual implant can be evaluated to assess expected treatment outcomes, performance of the virtual implant (e.g., fatigue life, loading characteristics, etc.), or the like. For example, contact and load transfer can be analyzed. The corrected model can be adjusted to properly position anatomic elements with respect to the virtual implant/medical device. Material properties of the implant can be adjusted to manage load transfers.

The patient data can include images of the patient's body, clinician input, treatment plan information, or the like. The corrected model can be generated by processing (e.g., segmenting, filtering, edge detection, partitioning, etc.) the images and then analyzing, for example, anatomical features of interest. Anatomical features can be manipulated (e.g., resized, moved, translated, rotated, etc.) to generate the corrected model. The corrected model can be used to simulate different procedures with different virtual implants.

Treatments can be simulated, and predictive modeling can account for the progression of diseases. One or more predictive models can be generated based on anticipated anatomical changes in order to configure the patient-specific implant. The anticipated anatomical changes can include changes of anatomy geometry, mechanical properties, tissue characteristics, or the like caused by, for example, disease progression, aging, or the like. Any number of predictive models can be used to design patient-specific implants suitable for a desired length of time. For example, a patient-specific implant can be designed for patients (e.g., patients with osteoporosis) who often experience significant bone density decreases. A rate of bone density loss (e.g., 0.3%-0.5% bone density loss per year, 0.3%-1% bone density loss per year, etc.) can be used to model the progression of vertebral bone density loss. The implant design can be updated based on predictive models accounting for such bone density decreases. In another example, predictive models can account for hardening of vertebral disc that reduces fracture toughness. The design of the implant can be adjusted to account for anticipated reduction in fracture toughness by increasing implant compliance, redistributing loads to compensate for reductions in fracture toughness, etc. In another example, predictive models can be based on anticipated geometrical anatomical changes, such as shortening of the spine length, senile kyphosis, muscle weakening (e.g., muscle weakening associated with aging), etc. The predictive models can simulate outcomes analyzed by a clinician, a machine learning model, combinations thereof, or the like. The number and types of models (e.g., a set of predictive models, a combination of non-predictive and predictive models, etc.) used can be selected based on the patient's age, rate of disease progression, symptoms, targeted quality of life, targeted mobility, or other criteria.

At block 550, patient-specific implants (e.g., implant 110 of FIG. 6) can be produced based on the virtual implants, models, simulations, etc.

The methods (e.g., methods 400 and 500) can include other steps disclosed herein. Some implementations can be operational with numerous other computing system environments or configurations. Examples of computing systems, environments, and/or configurations that may be suitable for use with the technology include, but are not limited to, personal computers, server computers, handheld or laptop devices, cellular telephones, wearable electronics, tablet devices, multiprocessor systems, microprocessor-based systems, programmable consumer electronics, network PCs, minicomputers, mainframe computers, distributed computing environments that include any of the above systems or devices, or the like.

The embodiments, features, systems, devices, materials, methods and techniques described herein may, in some embodiments, be similar to any one or more of the embodiments, features, systems, devices, materials, methods and techniques described in the following:

U.S. application Ser. No. 16/048,167, filed on Jul. 27, 2017, titled "SYSTEMS AND METHODS FOR ASSISTING AND AUGMENTING SURGICAL PROCEDURES;"

U.S. application Ser. No. 16/242,877, filed on Jan. 8, 2019, titled "SYSTEMS AND METHODS OF ASSISTING A SURGEON WITH SCREW PLACEMENT DURING SPINAL SURGERY;"

U.S. application Ser. No. 16/207,116, filed on Dec. 1, 2018, titled "SYSTEMS AND METHODS FOR MULTI-PLANAR ORTHOPEDIC ALIGNMENT;"

U.S. application Ser. No. 16/352,699, filed on Mar. 13, 2019, titled "SYSTEMS AND METHODS FOR ORTHOPEDIC IMPLANT FIXATION;"

U.S. application Ser. No. 16/383,215, filed on Apr. 12, 2019, titled "SYSTEMS AND METHODS FOR ORTHOPEDIC IMPLANT FIXATION;"

U.S. application Ser. No. 62/773,127, filed on Nov. 29, 2018, titled "SYSTEMS AND METHODS FOR ORTHOPEDIC IMPLANTS;"

U.S. application Ser. No. 62/928,909, filed on Oct. 31, 2019, titled "SYSTEMS AND METHODS FOR DESIGNING ORTHOPEDIC IMPLANTS BASED ON TISSUE CHARACTERISTICS;"

U.S. application Ser. No. 16/735,222, filed Jan. 6, 2020, titled "PATIENT-SPECIFIC MEDICAL PROCEDURES AND DEVICES, AND ASSOCIATED SYSTEMS AND METHODS;"

U.S. application Ser. No. 16/987,113, filed Aug. 6, 2020, titled "PATIENT-SPECIFIC ARTIFICIAL DISCS, IMPLANTS AND ASSOCIATED SYSTEMS AND METHODS;" and U.S. application Ser. No. 16/990,810, filed Aug. 11, 2020, titled "LINKING PATIENT-SPECIFIC MEDICAL DEVICES WITH PATIENT-SPECIFIC DATA, AND ASSOCIATED SYSTEMS, DEVICES, AND METHODS."

All of the above-identified patents and applications are incorporated by reference in their entireties. In addition, the embodiments, features, systems, devices, materials, methods and techniques described herein may, in certain embodiments, be applied to or used in connection with any one or more of the embodiments, features, systems, devices, or other matter.

The ranges disclosed herein also encompass any and all overlap, sub-ranges, and combinations thereof. Language such as "up to," "at least," "greater than," "less than," "between," and the like includes the number recited. Numbers preceded by a term such as "approximately", "about", and "substantially" as used herein include the recited numbers (e.g., about 10%=10%), and also represent an amount close to the stated amount that still performs a desired function or achieves a desired result. For example, the terms "approximately", "about", and "substantially" may refer to an amount that is within less than 10% of, within less than 5% of, within less than 1% of, within less than 0.1% of, and within less than 0.01% of the stated amount.

While embodiments have been shown and described, various modifications may be made without departing from the scope of the inventive concepts disclosed herein.

What is claimed is:

1. A computer-implemented method for designing a patient-specific implant, the method comprising:
analyzing image data of a patient to identify at least one tissue characteristic of one or more portions of one or more vertebrae of the patient, wherein the at least one tissue characteristic includes tissue density, tissue elasticity, tissue compliance, tissue stiffness, and/or tissue strength; and designing a patient-specific implant to be implanted at and/or proximate the one or more vertebrae based at least in part on the identified at least one tissue characteristic, such that regions of the patient-specific implant designed to contact the one or more portions of the one or more vertebrae include implant characteristics that are different than the at least one tissue characteristic of the corresponding one or more portions of the one or more vertebrae.

2. The method of claim 1 wherein the at least one tissue characteristic includes tissue stiffness, and wherein designing the patient-specific implant includes designing the patient-specific implant to have an implant stiffness, and wherein the ratio between the implant stiffness and the tissue stiffness is between 0.8:1 and 1.2:1.

3. The method of claim 1 wherein the at least one tissue characteristic includes tissue compliance, and wherein designing the patient-specific implant includes designing the patient-specific implant to be more compliant than the tissue compliance.

4. The method of claim 1 wherein the at least one tissue characteristic includes tissue density, and wherein designing the patient-specific implant includes designing the implant such that, when implanted, the implant is configured to contact a portion of the one or more vertebrae having a relatively higher tissue density compared to non-contacted portions of the one or more vertebrae.

5. The method of claim 1 wherein the one or more vertebrae include a first vertebra and a second vertebra, and wherein the patient-specific implant is an interbody device having one or more lattice structures, and further wherein designing the patient-specific implant includes designing the one or more lattice structures based at least in part on the identified at least one tissue characteristic.

6. The method of claim 5 wherein the at least one tissue characteristic includes tissue elasticity, and wherein designing the one or more lattice structures based at least in part on the identified at least one tissue characteristic includes designing the one or more lattice structures to have a modulus of elasticity that is different than the tissue elasticity.

7. The method of claim 5 wherein the patient-specific implant further includes a first endplate configured to interface with a first vertebra and a second endplate configured to interface with a second vertebra, wherein the one or lattice structures are positioned between the first endplate and the second endplate, and wherein the first endplate is designed to match a surface topography of the first vertebra and the second endplate is designed to match the surface topography of the second vertebra.

8. The method of claim 1, further comprising predicting a change in the tissue characteristic over a period of time, wherein designing the patient-specific implant is further based at least in part on the predicted change in the tissue characteristic.

9. The method of claim 8 wherein predicting the change in the tissue characteristic over the period of time includes estimating a rate of a disease progression in the patient.

10. The method of claim 8 wherein predicting the change in the tissue characteristic includes using a trained machine learning model to predict the change in the tissue characteristic.

11. The method of claim 1 wherein the at least one tissue characteristic is tissue density, and wherein analyzing the image data includes generating, based on the image data, a tissue density image or model.

12. The method of claim 11 wherein the tissue density image or model is color coded.

13. The method of claim 1, further comprising:
displaying a virtual model of the patient-specific implant;
receiving one or more alterations to the patient-specific implant; and
updating the virtual model of the patient-specific implant based on the one or more alterations.

14. The method of claim 1, further comprising generating manufacturing information for manufacturing the patient-specific implant.

15. A system for designing a patient-specific implant, the system comprising:
one or more processors; and
a memory storing instructions that, when executed by the one or more processors, cause the system to perform operations comprising:
analyzing image data of a patient to identify at least one tissue characteristic of one or more portions of one or more vertebrae of the patient, wherein the at least one tissue characteristic includes tissue density, tissue elasticity, tissue compliance, tissue stiffness, and/or tissue strength; and
designing a patient-specific implant to be implanted at and/or proximate the one or more vertebrae based at least in part on the identified at least one tissue characteristic, such that regions of the patient-specific implant designed to contact the one or more portions of the one or more vertebrae include implant characteristics that are different than the at least one tissue characteristic of the corresponding one or more portions of the one or more vertebrae.

16. The system of claim 15 wherein the at least one tissue characteristic includes tissue stiffness, and wherein designing the patient-specific implant includes designing the patient-specific implant to have an implant stiffness, and wherein the ratio between the implant stiffness and the tissue stiffness is between 0.8:1 and 1.2:1.

17. The system of claim 15 wherein the at least one tissue characteristic includes tissue compliance, and wherein designing the patient-specific implant includes designing the patient-specific implant to be more compliant than the tissue compliance.

18. The system of claim 15 wherein the at least one tissue characteristic includes tissue density, and wherein designing the patient-specific implant includes designing the implant such that, when implanted, the implant is configured to contact a portion of the one or more vertebrae having a relatively higher tissue density compared to non-contacted portions of the one or more vertebrae.

19. The system of claim 15 wherein the one or more vertebrae include a first vertebra and a second vertebra, and wherein the patient-specific implant is an interbody device having one or more lattice structures, and further wherein designing the patient-specific implant includes designing the one or more lattice structures based at least in part on the identified at least one tissue characteristic.

20. The system of claim 19 wherein the at least one tissue characteristic includes tissue elasticity, and wherein designing the one or more lattice structures based at least in part on the identified at least one tissue characteristic includes designing the one or more lattice structures to have a modulus of elasticity that is different than the tissue elasticity.

21. The system of claim 16 wherein the patient-specific implant further includes a first endplate configured to interface with a first vertebra and a second endplate configured to interface with a second vertebra, wherein the one or lattice structures are positioned between the first endplate and the second endplate, and wherein the first endplate is designed to match a surface topography of the first vertebra and the second endplate is designed to match the surface topography of the second vertebra.

22. The system of claim 15 wherein the operations further comprise predicting a change in the tissue characteristic over a period of time, and wherein designing the patient-specific implant is further based at least in part on the predicted change in the tissue characteristic.

23. The system of claim 22 wherein predicting the change in the tissue characteristic over the period of time includes estimating a rate of a disease progression in the patient.

24. The system of claim 22 wherein predicting the change in the tissue characteristic includes using a trained machine learning model to predict the change in the tissue characteristic.

25. A computer-implemented method for designing a patient-specific implant, the method comprising:
 generating, based off of image data of a patient's spinal cord region, a tissue density image or model, wherein the tissue density image or model illustrates the relative density of one or more portions of a vertebra in the patient's spinal cord region; and
 based at least in part on the tissue density image or model, deriving a stiffness of the one or more portions of the vertebra; and
 designing a patient-specific vertebral implant to be implanted adjacent the vertebra based at least in part on the stiffness of the vertebra, such that regions of the patient-specific implant designed to contact the one or more portions of the vertebra have an implant stiffness that is different than the stiffness of the one or more portions of the vertebrae.

26. The method of claim 25 wherein the regions of the patient-specific vertebral implant have a stiffness less than the stiffness of the one or more portions of the vertebra.

27. The computer-implemented method of claim 26 wherein the patient-specific implant includes a plurality of struts and a plurality of lattice structures, and wherein the plurality of struts and the plurality of lattices structures are designed to achieve the stiffness less than the stiffness of the one or more portions of the vertebra.

28. The computer-implemented method of claim 25 wherein deriving the stiffness of the vertebra includes deriving a modulus of elasticity of the vertebra, and wherein the patient-specific vertebral implant has a modulus of elasticity greater than the module of elasticity of the vertebra.

29. The computer-implemented method of claim 25 wherein the tissue density image or model is color coded.

30. The computer-implemented method of claim 25, further comprising predicting a rate of change in the stiffness of the vertebra, wherein designing the patient-specific vertebral implant is further based at least in part on the rate of change in the stiffness of the vertebra.

* * * * *